(12) United States Patent
Yoon et al.

(10) Patent No.: US 9,369,567 B2
(45) Date of Patent: Jun. 14, 2016

(54) MOBILE TERMINAL AND METHOD OF CONTROLLING EXTERNAL DEVICE USING THE SAME

(71) Applicant: LG ELECTRONICS INC., Seoul (KR)

(72) Inventors: Sunghye Yoon, Seoul (KR); Jiyoun Lee, Seoul (KR); Wonjoo Park, Seoul (KR); Meeohk Suh, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/642,490

(22) Filed: Mar. 9, 2015

(65) Prior Publication Data

US 2015/0381798 A1 Dec. 31, 2015

(30) Foreign Application Priority Data

Jun. 30, 2014 (KR) ........................ 10-2014-0080617

(51) Int. Cl.
| | |
|---|---|
| H04M 3/16 | (2006.01) |
| H04M 3/00 | (2006.01) |
| H04M 1/725 | (2006.01) |
| H04W 4/00 | (2009.01) |
| H04W 12/06 | (2009.01) |
| H04W 52/02 | (2009.01) |
| G06F 3/01 | (2006.01) |
| H04M 1/67 | (2006.01) |
| G06F 3/0488 | (2013.01) |
| G06F 3/0346 | (2013.01) |

(52) U.S. Cl.
CPC ........... *H04M 1/72577* (2013.01); *G06F 3/017* (2013.01); *G06F 3/0346* (2013.01); *G06F 3/04883* (2013.01); *H04M 1/67* (2013.01); *H04M 1/7253* (2013.01); *H04M 1/72533* (2013.01); *H04M 1/72569* (2013.01); *H04W 4/008* (2013.01); *H04W 12/06* (2013.01); *H04W 52/0254* (2013.01); *H04M 2250/02* (2013.01); *H04M 2250/12* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 2009/0081950 | A1* | 3/2009 | Matsubara | H04H 60/80 455/3.06 |
| 2009/0239587 | A1 | 9/2009 | Negron et al. | |
| 2011/0130170 | A1 | 6/2011 | Han et al. | |
| 2011/0223899 | A1 | 9/2011 | Hiraide | |
| 2011/0283241 | A1 | 11/2011 | Miller et al. | |
| 2012/0231837 | A1* | 9/2012 | Hilbrink | H04M 1/72533 455/556.1 |
| 2014/0162605 | A1* | 6/2014 | Dwarkaprasad | H04W 12/08 455/411 |
| 2015/0177788 | A1* | 6/2015 | Tokutake | G06F 1/1649 345/659 |

* cited by examiner

*Primary Examiner* — Erika A Washington
(74) *Attorney, Agent, or Firm* — Birch, Stewart, Kolasch & Birch, LLP

(57) ABSTRACT

A mobile terminal including a short-range communication module configured to provide short-range wireless communication; a touch screen; and a controller configured to deactivate the touch screen and enter the mobile terminal into a lock state, detect the mobile terminal is tilted more than a predetermined slope, receive a first touch input on the deactivated touch screen, and control the short-range communication module to transmit a first IR signal to an external device for controlling the external device when the first touch input matches a predetermined password for unlocking the mobile terminal into an unlocked state.

18 Claims, 23 Drawing Sheets

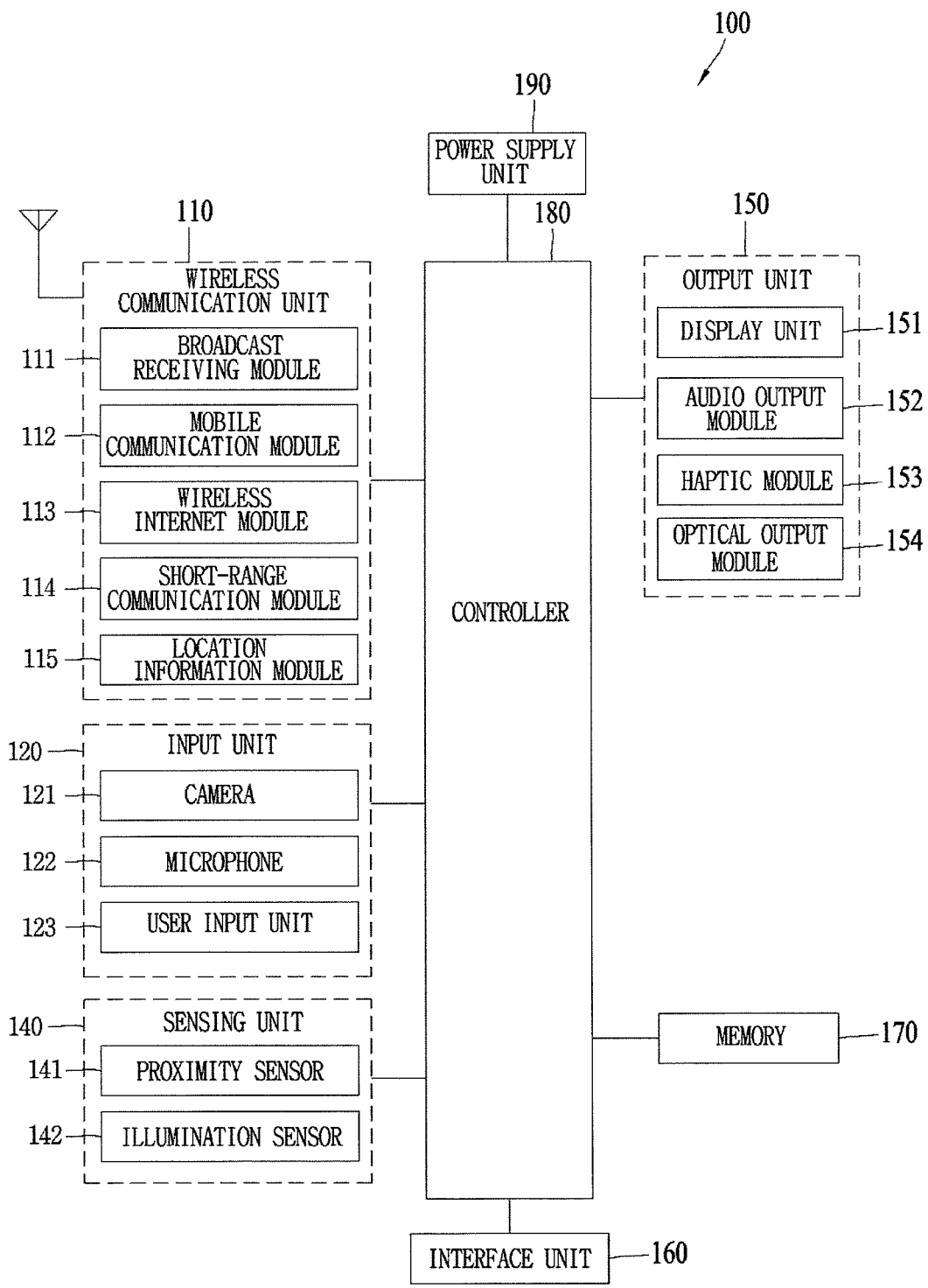

FIG. 10

| | IR signal corresponding to power On command |
|---|---|
| general case | 0X00 |
| mobile terminal is tilted and first touch input is detected | 701 — 0X001 — 702 |
| mobile terminal is tilted and second touch input is detected | 701 — 0X002 — 703 |

(a)

| | IR signal corresponding to power On command |
|---|---|
| general case | 0X00 |
| first mobile terminal is tilted and first touch input is detected | 701 — 0X0011 — 711 / 702 |
| first mobile terminal is tilted and second touch input is detected | 701 — 0X0021 — 711 / 703 |
| second mobile terminal is tilted and first touch input is detected | 701 — 0X0012 — 712 / 702 |
| second mobile terminal is tilted and second touch input is detected | 701 — 0X0022 — 712 / 703 |

| user | IR signal | user environment | restriction setting |
|---|---|---|---|
| father | 0X001 | first user environment | |
| mother | 0X002 | second user environment | |
| first sibling | 0X003 | third user environment | |
| last sibling | 0X004 | fourth user environment | O |

FIG. 13
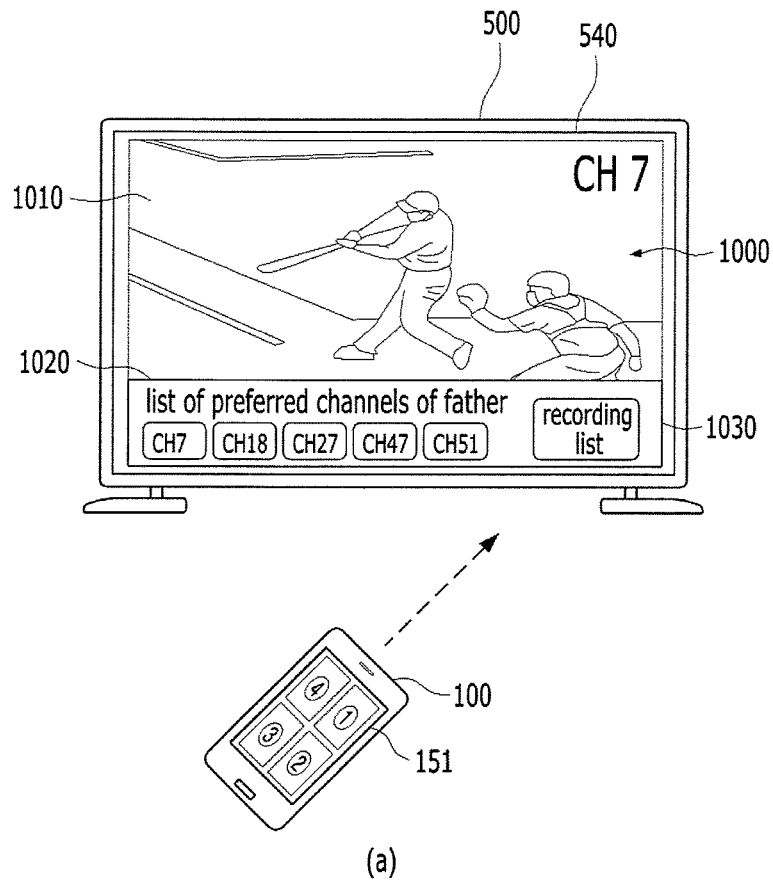
(a)
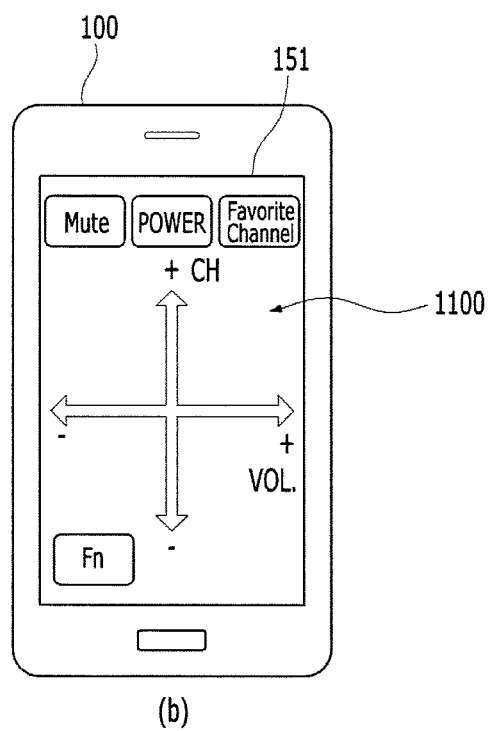
(b)

FIG. 14
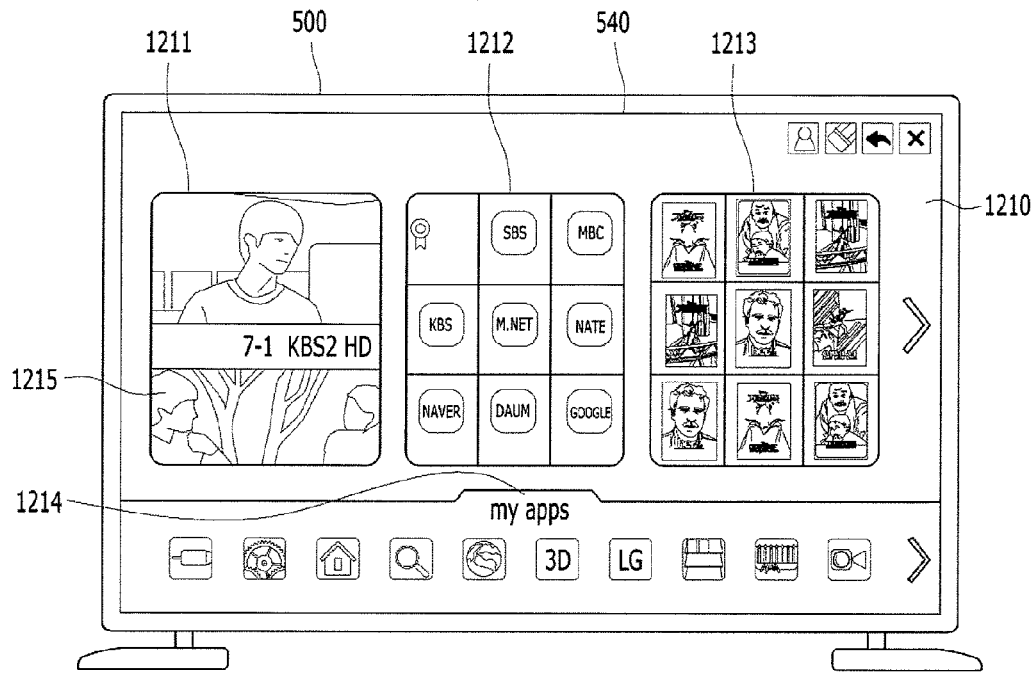
(a)
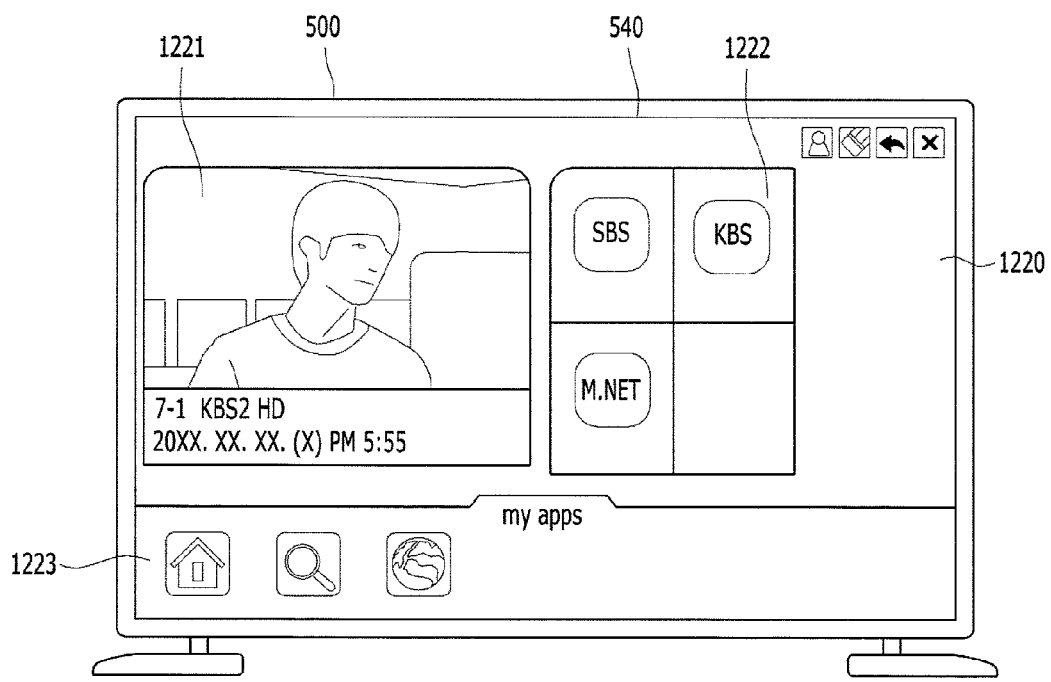
(b)

(a)  (b)

FIG. 18
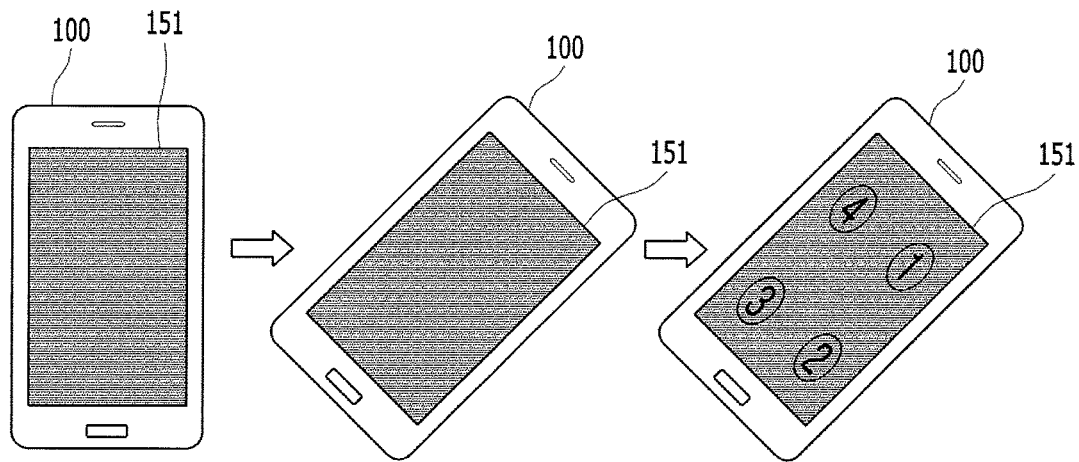
(a)
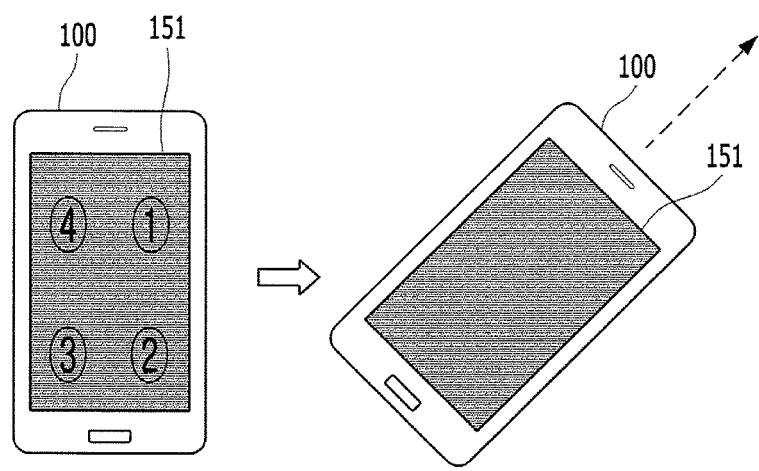
(b)

her than a predetermined slope is detected via the sensing unit and
MOBILE TERMINAL AND METHOD OF CONTROLLING EXTERNAL DEVICE USING THE SAME This application claims priority to Korean Patent Application No. 10-2014-0080617 filed on Jun. 30, 2014 in Korea, the entire contents of which is hereby incorporated by reference in its entirety.

BACKGROUND OF THE INVENTION

1. Field of the Invention

The present invention relates to a mobile terminal enabling a user to more conveniently use the terminal and a method of controlling therefor.

2. Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Recently, customers using a mobile terminal as a remote controller controlling an external device are gradually increasing. Yet, in this instance, a user has to unlock a screen lock of the mobile terminal and separately execute a remote controller application to use the mobile terminal as a remote controller. Hence, there still exist inconveniences.

SUMMARY OF THE INVENTION

Accordingly, an object of the present invention is to address the above-noted and other problems.

Another object of the present invention is to provide a user-friendly mobile terminal and a method of controlling an external device using the same by enabling cancelling of a screen lock of the mobile terminal and executing of a remote controller application to be executed at a time.

When controlling an external device using a mobile terminal according to one embodiment of the present invention, the other object of the present invention is to make the mobile terminal and the external device provide user customized environment.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a mobile terminal includes a sensing unit configured to detect a tilt of the mobile terminal, a short-range communication module, a display unit to which a screen lock is set and a controller, the controller, if the mobile terminal tilted more than a predetermined slope is detected via the sensing unit and a first touch input is detected when the display unit is inactivated, configured to control the short-range communication module to transmit a predetermined first IR signal.

To further achieve these objects and other advantages and in accordance with the purpose of the invention, as embodied and broadly described herein, according to one embodiment, a method of controlling an external device using a mobile terminal includes the steps of detecting the mobile terminal tilted more than a predetermined slope, detecting a first touch input corresponding to a first user in the mobile terminal when a display unit is inactivated, transmitting a first IR signal corresponding to the first touch input in the mobile terminal, receiving the first IR signal in an external device and turning on power of the external device based on the received first IR signal and entering a first user environment mode corresponding to the first user in the external device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

Both the foregoing general description and the following detailed description of the present invention are and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1A is a block diagram of a mobile terminal in accordance with the present disclosure;

FIG. 10 is a diagram illustrating examples of an IR signal transmitted to an external device from a mobile terminal according to one embodiment of the present invention;

FIG. 11 is a diagram illustrating an example of a database stored in a memory of a multimedia device according to one embodiment of the present invention;

FIG. 13 is a diagram illustrating an example of screens displayed on a display unit of a multimedia device and a display unit of a mobile terminal, respectively, when a slope greater than a predetermined slope and a predetermined touch input are detected in the mobile terminal according to one embodiment of the present invention;

FIG. 14 is a diagram illustrating a different example of a screen displayed on a display unit of a multimedia device when a predetermined IR signal is transmitted to the multimedia device from a mobile terminal according to one embodiment of the present invention;

FIG. 18 is a diagram illustrating activation timing of an IR signal transmitting unit included in a mobile terminal according to one embodiment of the present invention;

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like. By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
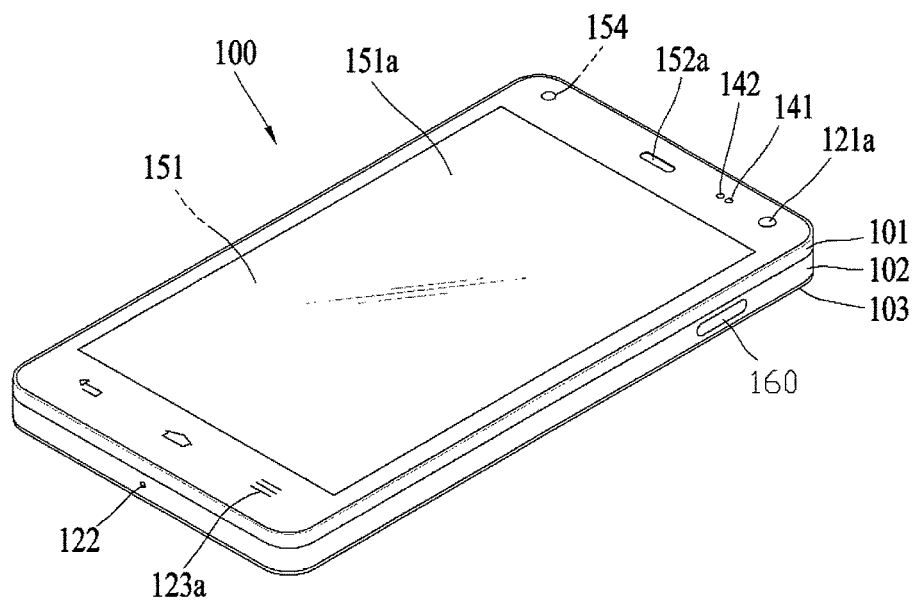
FIGS. 1B and 1C are conceptual views of one example of the mobile terminal, viewed from different directions.
Figure 1C:
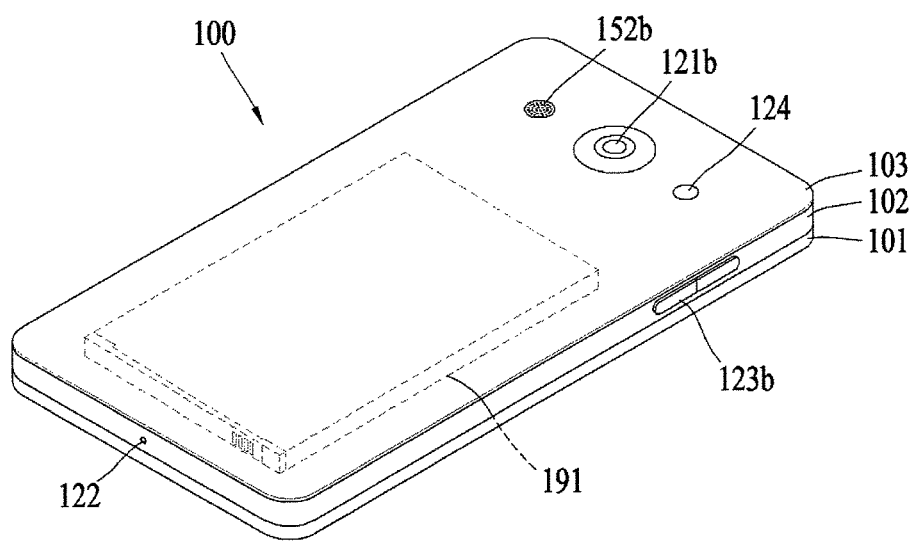

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by the controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

A system which generates and transmits a broadcast signal and/or broadcast associated information, or a server which receives a pre-generated broadcast signal and/or broadcast associated information, and sends such items to the mobile terminal is provided. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information. In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces. The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123. The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
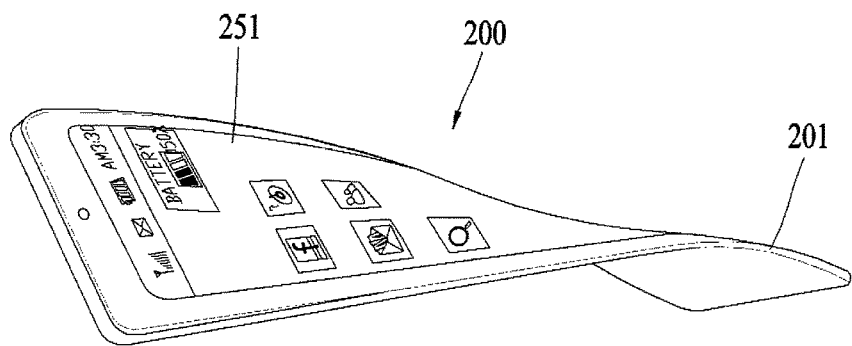
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, the controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like. In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
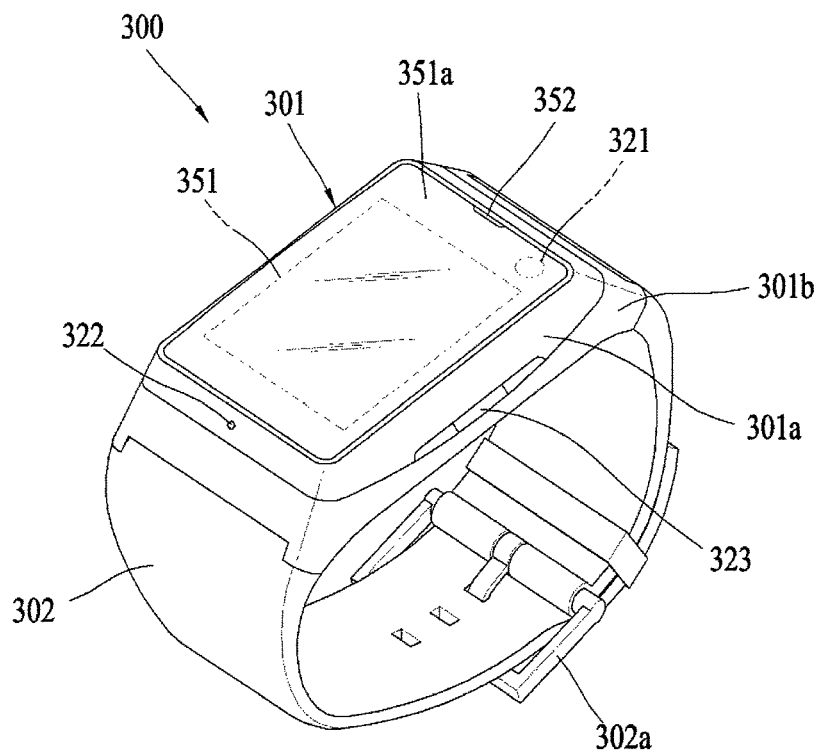
FIG. 3 is a conceptual view of a wearable mobile terminal according to another alternative embodiment of the present disclosure.

FIG. 3 is a perspective view illustrating one example of a watch-type mobile terminal 300 in accordance with another embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
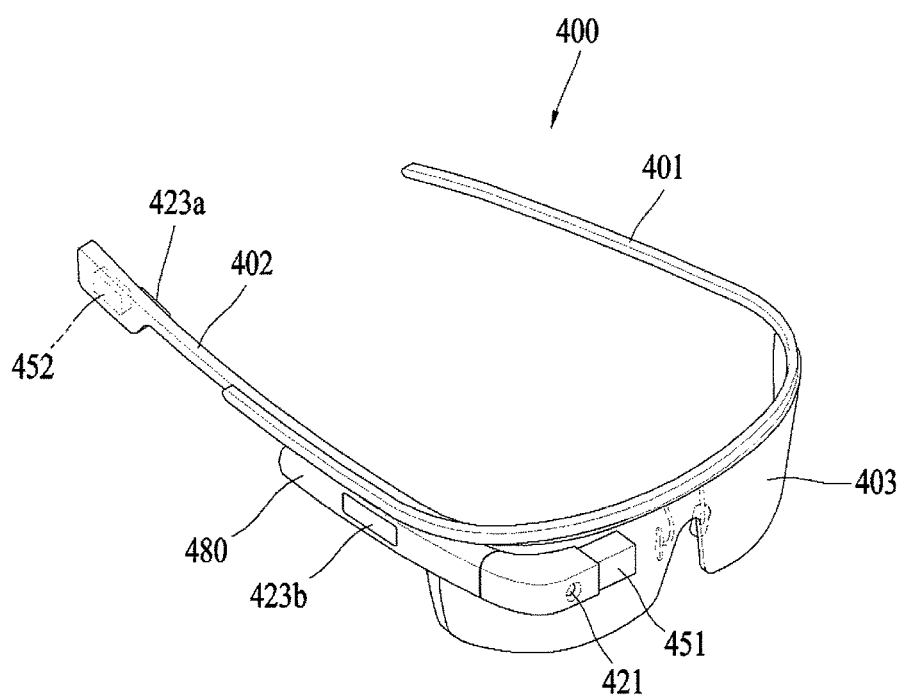
FIG. 4 is a conceptual view of a wearable mobile terminal according to another alternative embodiment of the present disclosure.

FIG. 4 is a perspective view illustrating one example of a glass-type mobile terminal 400 according to another embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e.g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof. Embodiments of the present invention are explained with an example that a mobile terminal corresponds to a mobile terminal 100 shown in FIG. 1A to FIG. 1C. Yet, according to embodiment, a mobile terminal may correspond to one of a mobile terminal shown in FIG. 2, a mobile terminal 300 shown in FIG. 3 and a mobile terminal 400 shown in FIG. 4.

An external device described in the present specification may indicate all electronic devices (e.g., a TV, a multimedia device, a digital broadcast receiver, a refrigerator, a computer and the like) except a mobile terminal. The present specification explains a multimedia device 100 as an example of an external device. For instance, the multimedia device 100 explained in the present specification corresponds to an intelligent network TV of which a computer support function is added to a broadcast reception function. Hence, the multimedia device 100 may correspond to a device to which an internet function and the like are added while being faithful to a broadcast reception function. As an example, the multimedia device 100 may correspond to a network TV, a smart TV, a HBBTV (hybrid broadcast broadband television), an internet TV, a web TV, an IPTV (internet protocol television) or the like.

Figure 5:
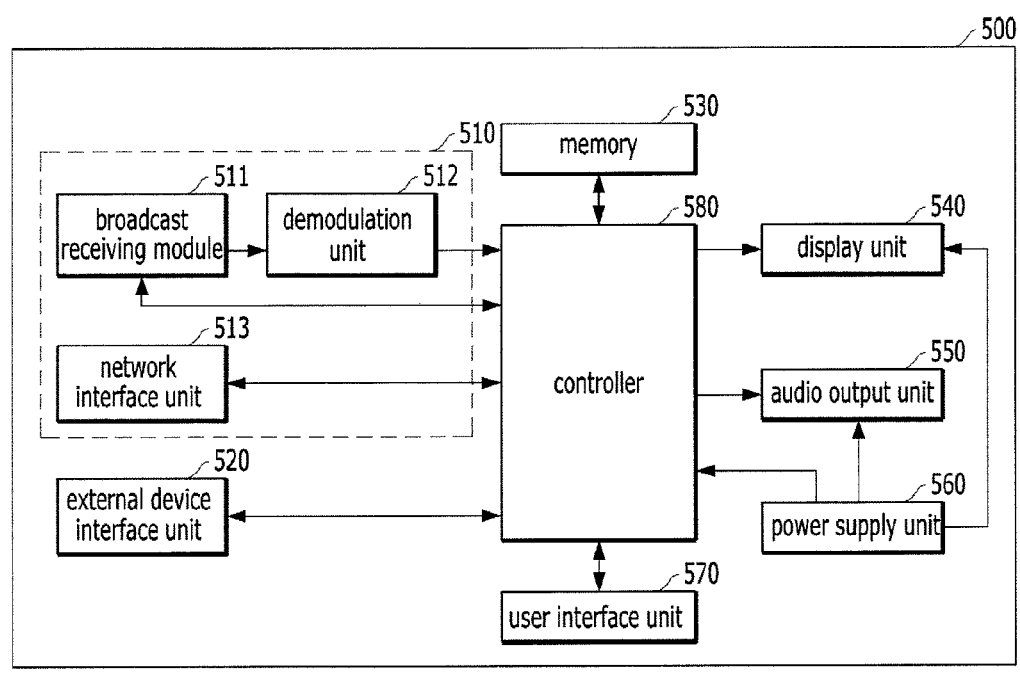
FIG. 5 is a block diagram illustrating a multimedia device, which becomes a target of controlling of a mobile terminal according to one embodiment of the present invention.

FIG. 5 is a block diagram illustrating a multimedia device, which becomes a target of controlling of a mobile terminal according to one embodiment of the present invention. A multimedia device 500 can include a receiving unit 510, an external device interface unit 520, a memory 530, a display unit 540, an audio output unit 550, a power supply unit 560, a user interface unit 570, a controller 580 and the like. Yet, configuration elements shown in FIG. 5 may not be essential for implementing the multimedia device 100. Hence, the multimedia device 100 explained in the present specification may include configuration elements more or less than the aforementioned configuration elements.

The receiving unit 510 can include a tuner 511, a demodulation unit 512 and a network interface unit 513. In some cases, a plurality of tuners 511 can be included in the receiving unit. For instance, the tuner 511 can receive an RF broadcast signal of a single carrier according to an ATSC (advanced television system committee) scheme or RF broadcast signals of a plurality of carriers according to a DVB (digital video broadcasting) scheme.

The demodulation unit 512 receives a converted digital IF signal (DIF) from the tuner 511 and performs a demodulation operation. For instance, if a digital IF signal output from the tuner 511 is output according to the ATSC scheme, the demodulation unit 512 performs 8-VSB (8-vestigal side band) demodulation for example.

The network interface unit 513 provides an interface to connect the multimedia device 100 with a wired/wireless network including the internet. For instance, the network interface unit 513 can be equipped with an Ethernet terminal and the like to access a wired network. In order to access a wireless network, such a communication standard as WLAN (wireless LAN) (Wi-Fi), Wibro (wireless broadband), Wimax (world interoperability for microwave access), HSDPA (high speed downlink packet access) and the like can be used.

The network interface unit 513 can transceive data with a different user or a different electronic device via an accessed network or a different network linked to the accessed network. The external device interface unit 520 corresponds to an interface enabling data communication between an external device and a multimedia device 100 to be performed. The external device interface unit 520 can be connected with such an external device as a DVD (digital versatile disk), a Blu-ray, a gaming device, a camera, a camcorder, a computer (notebook) an STB and the like in wired/wireless. The external device interface unit 120 delivers an image, audio, or a data signal input from external via a connected external device to the controller 580. And, the external device interface unit can also output an image, audio, or a data signal processed by the controller 580 to an external device.

The external device interface unit 520 can include a USB terminal, a CVBS (composite video banking sync) terminal, a component terminal, an S-video terminal (analog), a DVI (digital visual interface) terminal, a HDMI (high definition multimedia interface) terminal, an RGB terminal, a D-SUB terminal and the like for example. The HDMI corresponds to an interface delivering an image of a digital scheme and an audio signal using a single cable at the same time. If both a playback device and an output device are equipped with the HDMI terminal, it can conveniently transmit and receive a video signal and an audio signal by connecting a HDMI cable only between the playback device and the output device.

The memory 530 can store a program used for processing and controlling each signal in the controller 180 and can store a signal-processed image, audio or a data signal. The memory 530 may also perform a function of temporarily storing an image, audio or a data signal input from the external interface unit 520 or the network interface unit 513. For instance, the memory 530 stores various OSs, middleware and platforms.

The display unit 540 generates a driving signal by converting an image signal, a data signal and an OSD signal processed by the controller 580 or an image signal, a data signal and the like received by the external interface unit 520 into R, G and B signal, respectively. The display unit 540 can be implemented by a PDP, an LCD, an OLED, a flexible display, a 3D display or the like.

The audio output unit 550 receives such an audio-processed signal input processed by the controller 180 as a stereo signal, a 3.1 channel signal or a 5.1 channel signal and outputs it as audio. The audio output unit 550 can be implemented by a speaker in various forms.

The power supply unit 560 supplies power to the overall of the multimedia device 100. In particular, the power supply unit can supply power to the controller 180 capable of being implemented by a form of SOC (system on chip), the display unit 540 configured to display an image and the audio output unit 550 configured to output audio.

The user interface unit 570 delivers a signal input by a user to the controller 180 or transmits a signal received from the controller 580 to a remote controller. In the present specification, the remote controller may correspond to a mobile terminal 100. For instance, the user interface unit 570 can be configured to receive such a control signal as power on/off, channel selection, screen setting or the like from the remote controller and process the control signal according to various communication schemes such as an RF (radio frequency) communication scheme, an IR (infrared) communication scheme and the like. Or, the user interface unit can be configured to transmit a control signal received from the controller 580 to the remote controller.

The controller 580 controls each of the configuration modules of the multimedia device 100. The controller 580 can generate and outputs a signal used for outputting an image or audio by demultiplexing a stream input via the tuner 511, the demodulation unit 512, the network interface unit 513 or the external device interface unit 520 or processing demultiplexed signals. Regarding the controller 580, it shall be described in more detail with reference to FIG. 6 in the following.

Figure 6:
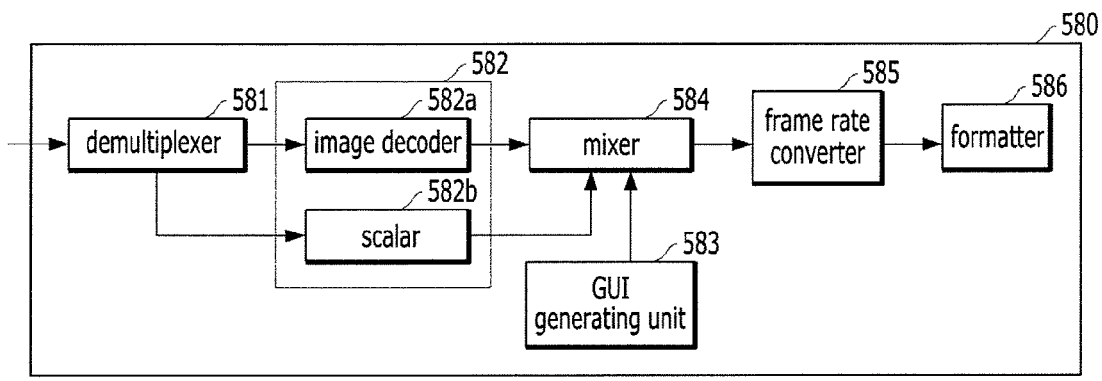
FIG. 6 is a more detail block diagram illustrating a controller of the multimedia device shown in FIG. 5.

FIG. 6 is a detail block diagram illustrating a controller 580 of the multimedia device 500 shown in FIG. 5. Referring to FIG. 6, the controller 580 of the multimedia device 500 includes a demultiplexer 581, an image processing unit 582, a GUI generating unit 583, a mixer 584, a frame rate converter 585, a formatter 586 and the like. The controller can further include an audio processing unit and a data processing unit.

The demultiplexer 581 demultiplexes an input stream. For instance, if MPEG-2 TS is input, the demultiplexer demultiplexes the MPEG-2 TS and can divide the MPEG-2 TS into an image, audio and a data signal. The image processing unit 582 can perform image processing of a demultiplexed image signal. Thus, the image processing unit 582 can include an image decoder 582a and a scalar 582b. The image decoder 582a decodes the demultiplexed image signal and the scalar 582b performs scaling to make the video output unit output resolution of the decoded image signal. The image signal decoded by the image processing unit 582 is input to the mixer 584.

The GUI generating unit 583 generates a GUI signal according to a user input or autonomously. Hence, the mixer 584 can mix the GUI signal generated by the GUI generating unit 583 and a decoded image signal image-processed by the image processing unit 582. The GUI generating unit 583 includes an OSD generating unit generating an OSD (on screen display) signal in which configuration information of the multimedia device 100 is included. A mixed signal is provided to the formatter 586. If a decoded broadcast image signal or an external input signal is mixed with the GUI signal or the OSD signal, a GUI or an OSD can be displayed by being overlaid on a broadcast image or an external input image.

The frame rate converter (FRC) 585 can convert a frame rate of an input image. For instance, the FRC converts a 60 Hz frame rate into 120 Hz or 240 Hz. When converting 60 Hz frame rate into 120 Hz, it can insert an identical first frame between the first frame and a second frame. Or, it can insert a third frame anticipated from the first and the second frame between the first frame and the second frame. When converting 60 Hz frame rate into 240 Hz, it can insert 3 more identical frames or 3 anticipated frames between the first and the second frame. Meanwhile, it can also maintain an input frame rate without any separate conversion.

The formatter 586 receives an input of an output signal of the frame rate converter 585, changes a format of the signal to be appropriate for the video output unit and outputs the signal. For instance, the formatter can output R, G and B data signal. The R, G and B data signal can be output by LVDS (low voltage differential signaling) or mini-LVDS.

In the following, a mobile terminal related to embodiments of the present invention and a method of controlling an external device using the mobile terminal are described in detail with reference to FIG. 7 to FIG. 23. As mentioned in the foregoing description, FIG. 7 to FIG. 23 explains the multimedia device 500 as an example of an external device becoming a target controlled by a mobile terminal. Assume that a remote controller application is installed in the mobile terminal 100 to control the multimedia device 500. If a screen including a remote controller UI is output on the display unit 151 of the mobile terminal 100 according to one embodiment of the present invention, the remote controller application is executed. Assume that the controller 180 knows an IR code value in advance corresponding to each function of the multimedia device 500 included in the remote controller UI output on the display unit 151.

Figure 7:
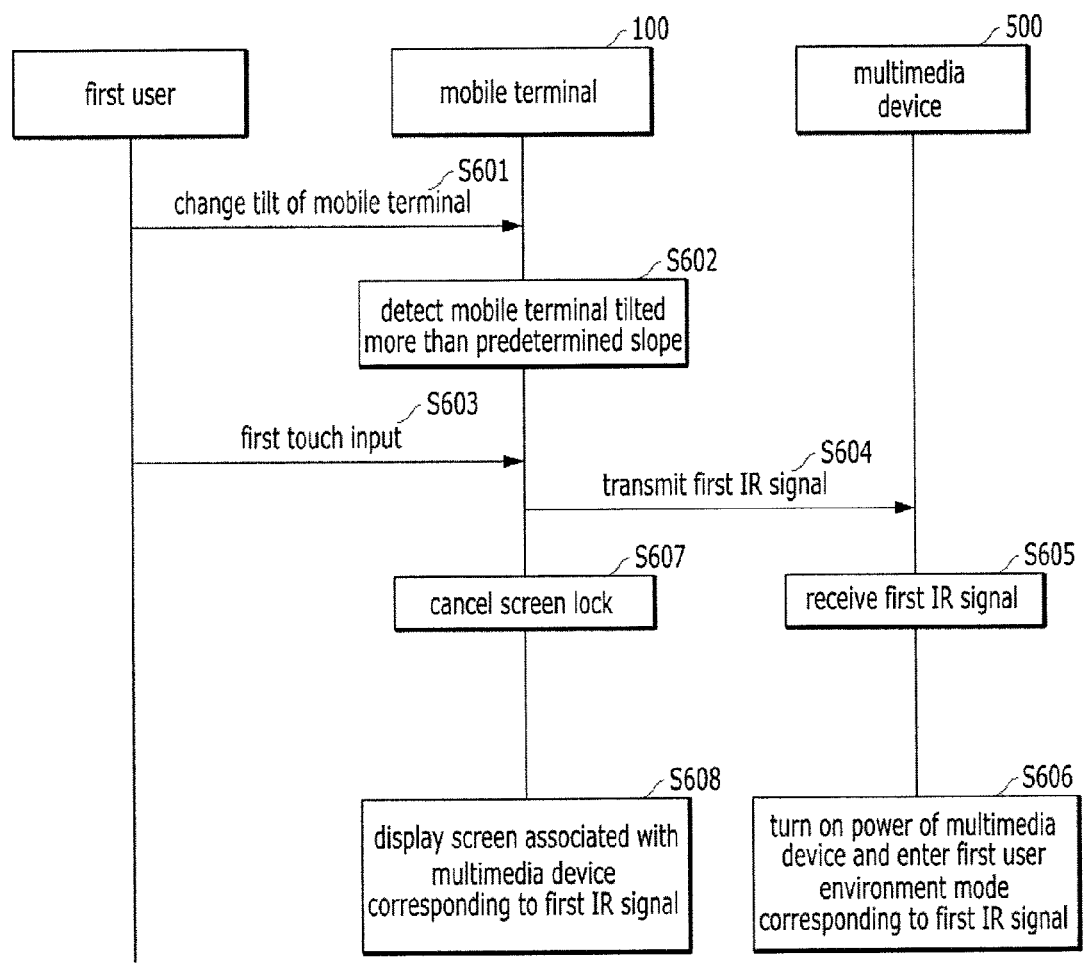
FIG. 7 is a flowchart illustrating an example of a method of controlling an external device using a mobile terminal according to one embodiment of the present invention.

FIG. 7 is a flowchart illustrating an example of a method of controlling an external device using a mobile terminal according to one embodiment of the present invention. A first user changes a slope of the mobile terminal 100 (S601) and the controller 180 detects that the mobile terminal 100 is tilted more than a predetermined slope via the sensing unit 140 (S602). In this instance, the first user is a person corresponding to a first touch input described later, the first user may indicate an owner of the mobile terminal 100. In order to distinguish the first user from a second user (a user who is not an owner of the mobile terminal 100 but a user of the mobile terminal 100 only) described in FIG. 8 and FIG. 9, such a terminology as the first user is used.

If the first user intends to control the multimedia device 500 by using the mobile terminal 100 as a remote controller, the first user can tilt the mobile terminal 100 toward the multimedia device 500. The controller 180 controls the sensing unit 140 to detect that the mobile terminal 100 is tilted more than a predetermined slope. As an example, the slope of the mobile terminal 100 can be detected by a gyroscope sensor included in the sensing unit 140. The controller 180 can maintain the gyroscope sensor included in the sensing unit 140 to be always in an activated state. In addition, according to one embodiment, the controller 180 can control the sensing unit 140 to detect a slope of the mobile terminal 100 only when the rear case 102 of the mobile terminal 100 is tilted more than a predetermined slope as much as the rear case of the mobile terminal is heading to a floor. In particular, if the mobile terminal 100 is tilted more than a predetermined slope as much as the front case 101 of the mobile terminal is heading to the floor, the controller 180 may not recognize it as the slope of the mobile terminal 100.

The controller 180 detects a first touch input received via the display unit 150 (S603). The first touch input can be detected when the mobile terminal 100 is tilted more than the predetermined slope. According to the present embodiment, the display unit 150 is implemented by a touch screen including a touch sensor. Assume that the display unit 150 is in an inactivated state until the first touch input is detected and a screen lock is set to the display unit 150. In this instance, the screen lock sets a security of the mobile terminal to restrict functions provided by the mobile terminal 100 until a predetermined password (e.g., a predetermined touch pattern) is input to the mobile terminal via the display unit 150.

In this instance, the touch pattern may correspond to a pattern continuously touching a plurality of points on a screen of the display unit 151 or a pattern discretely tapping a plurality of points on the screen of the display unit 151 according to a predetermined order. As an example, the first touch input may correspond to a password used for cancelling (that is, unlocking) a screen lock of the display unit 150. The memory 170 stores the first touch input used for cancelling the screen lock of the display unit 150 in advance and the first touch input can be set or changed by the first user.

The controller 180 controls the short-range communication module 114 to transmit a predetermined first IR signal (S604). That is, if the detected first touch input is matched with the password used for cancelling the screen lock of the display unit 150 stored in the memory 170, the controller 180 controls the short-range communication module 114 to transmit the predetermined first IR signal. As an example, the first IR signal can be transmitted by an IR signal transmitting unit included in the short-range communication module 114. The controller 180 can maintain the short-range communication module 114 (specifically, the IR signal transmitting unit) to always be in an activated state. Or, the controller can activate the short-range communication module 114 (specifically, the IR signal transmitting unit) only when the mobile terminal 100 is tilted more than a predetermined slope and the first touch input is detected.

In addition, the controller 580 of the multimedia device 500 controls the user interface unit 570 to receive the first IR signal (S605). Specifically, the IR signal can be received via an IR signal receiving unit included in the user interface unit 570. The controller 580 turns on the power of the multimedia device 500 based on the received first IR signal and enters a first user environment mode corresponding to the first IR signal (S606).

The first IR signal can include first information on a control command configured to turn on the power of the multimedia device 500 and second information configured to identify the first user. In this instance, the second information can be determined in relation to the first touch input. The memory 530 of the multimedia device 500 can store mapping data between a specific IR signal and a specific user in advance. The memory 530 can store a user environment corresponding to a specific user mapped to a specific IR signal in advance. Hence, the controller 580 turns on the power of the multimedia device 500 using the first information included in the first IR signal, identifies the first user using the second information included in the first IR signal and can enter a user environment mode corresponding to the identified first user.

In this instance, the user environment corresponds to a service environment of the multimedia device 500 customized to a specific user. Hence, the user environment may be associated with functions of the multimedia device 500, a configuration of a screen displayed on the display unit 540 and the like. The user environment can be set or changed by a corresponding user or a different user. An example of setting/changing the user environment by a different user instead of a corresponding user may corresponds to a case when parents set a restrictive condition to a user environment of a child.

For instance, the user environment mode corresponding to the first user may be associated with one of a sound volume of audio data output via the audio output unit 550 of the multimedia device 500, a size of at least one of a letter, a sign, a number and an icon displayed on the display unit 540, a font of a letter and a font of a number displayed on the display unit 540, a composition of a screen displayed on the display unit 540, an application installed in the multimedia device 500 by the first user and a predetermined preferred channel set by the first user when the multimedia device 500 is equipped with a broadcast reception function.

The controller 580 can control the display unit 151 to output a first screen corresponding to the first user environment mode. According to embodiment, when the multimedia device 500 has entered the first user environment mode, if there is a predetermined restrictive condition set by a user of the multimedia device 500 different from the first user, the controller 580 can control the display unit 151 to output a screen corresponding to the restrictive condition.

Meanwhile, if the first touch input is detected, the controller 180 cancels a screen lock of the display unit 151 (S607). In particular, if the detected first touch input is matched with a password used for cancelling the screen lock of the display unit 150 stored in the memory 170, the controller 180 activates a screen of the display unit 151 and cancels the screen lock. The steps S607 and S604 can be practically performed at the same time. Or, the step S607 can be preferentially performed compared to the step S604. Or, the step S607 can be performed later compared to the step S604.

The controller 180 can control the display unit 151 to display a second screen related to the multimedia device 500 in response to the first IR signal (S608). As mentioned in the foregoing description, when the mobile terminal 100 is tilted more than a predetermined slope, and if a first touch input is detected, the controller 180 outputs the second screen on the display unit 151 by executing a remote controller application. On the contrary, when the mobile terminal 100 is generally used (i.e., a state that the mobile terminal 100 tilted more than the predetermined slope is not detected), if the first touch input is detected, the controller cancels a screen lock and can output a predetermined home screen on the display unit 151. If a first user inputs a first touch input when the mobile terminal 100 is tilted more than the predetermined slope toward the multimedia device 500, this corresponds to an intention of the first user intending to control the multimedia device 500 using the mobile terminal 100 as a remote controller. The second screen can include a remote controller UI used for controlling the multimedia device 500.

The second screen can include a remote controller UI customized to the first user intending to control the multimedia device 500. In particular, if the first touch input is detected when the mobile terminal 100 is tilted more than the predetermined slope, the controller 180 executes a remote controller application stored in the memory 170 and can output the second screen including the remote controller UI, which is customized to the first user intending to control the multimedia device 500, on the display unit 151. The first user executes the remote controller application stored in the memory 170 and can set the remote controller UI customized to the first user in advance.

Figure 8:
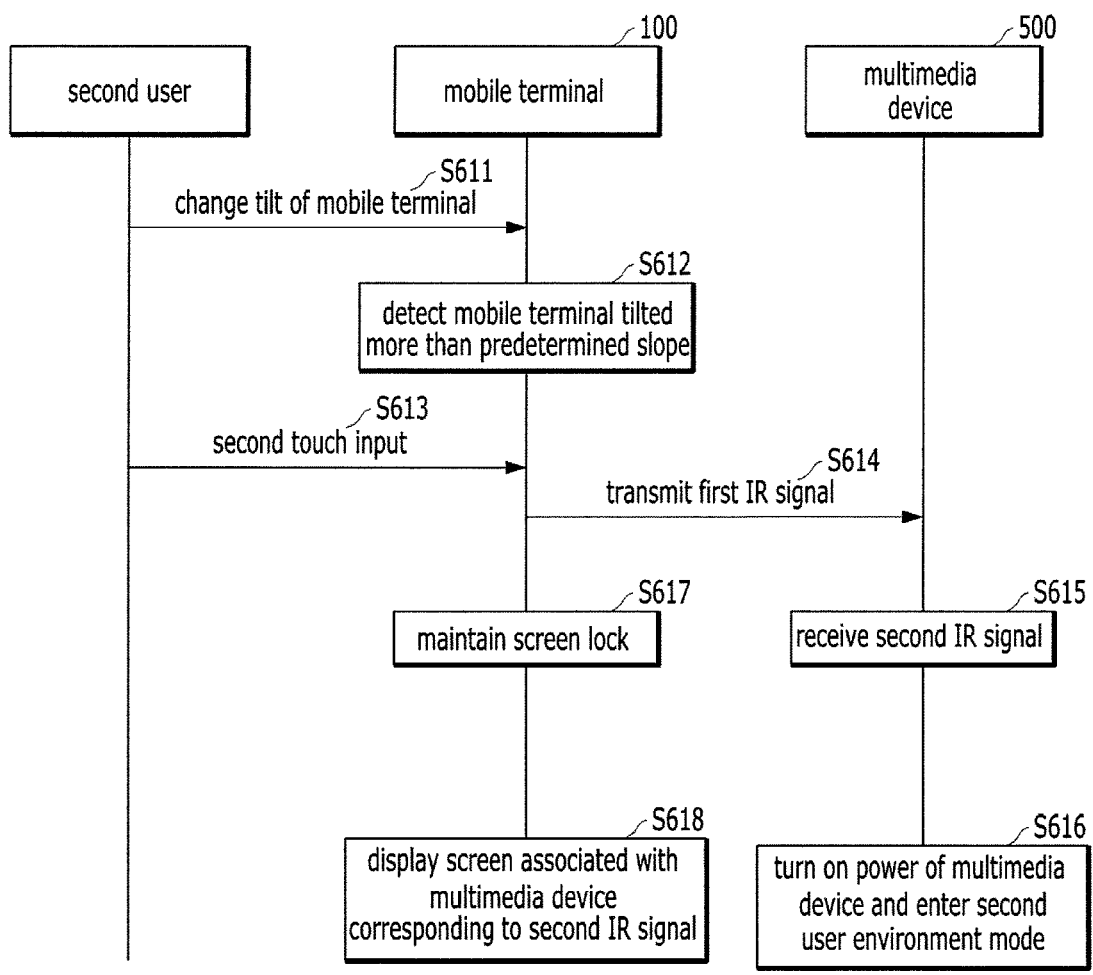
FIG. 8 is a flowchart illustrating a different example of a method of controlling an external device using a mobile terminal according to one embodiment of the present invention.

Next, FIG. 8 is a flowchart illustrating a different example of a method of controlling an external device using a mobile terminal according to one embodiment of the present invention. Contents overlapped with FIG. 7 are not explained again. In the following description, different points are mainly explained. In FIG. 8, a second user changes a slope of the mobile terminal 100 (S611) and the controller 180 detects that the mobile terminal 100 is tilted more than a predetermined slope via the sensing unit 140 (S612). In this instance, the second user is a person who is not an owner of the mobile terminal 100 but only a user of the mobile terminal. The second user is different from the first user. According to one embodiment of the present invention, the second user, which is not the owner of the mobile terminal 100, can also control the multimedia device 500 using the mobile terminal 100 and the multimedia device 500 can provide the second user with a user environment customized to the second user.

The controller 180 detects a second touch input received via the display unit 151 (S613). The second touch input can be detected when the mobile terminal 100 is tilted more than the predetermined slope. According to the present embodiment, the display unit 150 is implemented by a touch screen including a touch sensor. Assume that the display unit 150 is in an inactivated state until the second touch input is detected and a screen lock is set to the display unit 150. In this instance, the inactivated state of the display unit 150 may indicate that the touch sensor included in the display unit 150 is in an activated state to detect a touch input although a screen of the display unit 150 is turned off. The second touch input is not matched with a password used for cancelling the screen lock of the display unit 150. This is because the second user is not the owner of the mobile terminal 100. However, the memory 170 can store a mapping data between the second touch input and the second user in advance.

The controller 180 controls the short-range communication module 114 to transmit a predetermined second IR signal to the multimedia device 500 (S614). In this instance, the second IR signal is different from the first IR signal mentioned earlier with reference to FIG. 7. The memory 170 stores a mapping data between the second touch input and the second IR signal in advance. If the detected second touch input is not matched with the password used for cancelling the screen lock of the display unit 150 stored in the memory 170 and the second touch input corresponds to the second user, the controller 180 controls the short-range communication module 114 to transmit the predetermined second IR signal to the multimedia device 500.

In addition, the controller 580 controls the user interface unit 570 to receive the second IR signal (S615). The controller 580 turns on the power of the multimedia device 500 based on the received second IR signal and enters a second user environment mode corresponding to the second IR signal (S616). The second IR signal can include first information on a control command configured to turn on the power of the multimedia device 500 and second information configured to identify the second user.

In this instance, the second information can be determined in relation to the second touch input. The memory 530 of the multimedia device 500 can store mapping data between a specific IR signal and a specific user in advance. The memory 530 can store a user environment corresponding to a specific user mapped to a specific IR signal in advance. Hence, the controller 580 turns on the power of the multimedia device 500 using the first information included in the second IR signal, identifies the second user using the second information included in the second IR signal and can enter a user environment mode corresponding to the identified second user.

Since the user environment corresponding to the second user environment mode is set by the second user in the multimedia device 500 in advance, it may be different from the user environment corresponding to the first user environment mentioned earlier with reference to FIG. 7. The controller 580 can control the display unit 151 to output a first screen corresponding to the second user environment mode. According to one embodiment, when the multimedia device 500 has entered the second user environment mode, if there is a predetermined restrictive condition set by a user of the multimedia device 500 different from the second user, the controller 580 can control the display unit 151 to output a screen corresponding to the restrictive condition.

Meanwhile, if the second touch input is detected, the controller 180 activates the screen of the display unit 151 but maintains the screen lock (S617). This is because the second user is not an owner of the mobile terminal 100 and the second touch input is not matched with the password used for cancelling the screen lock of the display unit 150.

The controller 180 activates the display unit 151 and can control the display unit 151 to display a second screen associated with the multimedia device 500 in response to the second IR signal (S618). As mentioned in the foregoing description, if the second touch input is detected when the mobile terminal 100 is tilted more than the predetermined slope, the controller 180 outputs the second screen on the display unit 151 while maintaining the screen lock of the display unit 151. On the contrary, when the mobile terminal 100 is generally used (i.e., a state that the mobile terminal 100 tilted more than the predetermined slope is not detected), if the second touch input is detected, since the second touch input is not matched with the password used for cancelling the screen lock of the display unit 150, the controller 180 can output a message on the display unit 151 to indicate that lock of the display unit 150 is unable to be cancelled.

The second screen can include a remote controller UI intending to control the multimedia device 500. According to embodiment, if a remote controller UI, which is customized to a second user intending to control the multimedia device 500, is stored in the memory 170, the second screen can include a remote controller UI customized to the second user. If the remote controller UI, which is customized to the second user intending to control the multimedia device 500, is not stored in the memory 170, the second screen can include a general remote controller UI associated with the multimedia device 500. According to the present embodiment, if a second touch input is detected when the mobile terminal 100 is tilted more than a predetermined slope, the controller 180 activates the display unit 151 and outputs the second screen. Yet, since the screen lock of the display unit 151 is not cancelled, the second user cannot use other functions of the mobile terminal 100 except a function of a remote controller application corresponding to the second screen.

Figure 9:
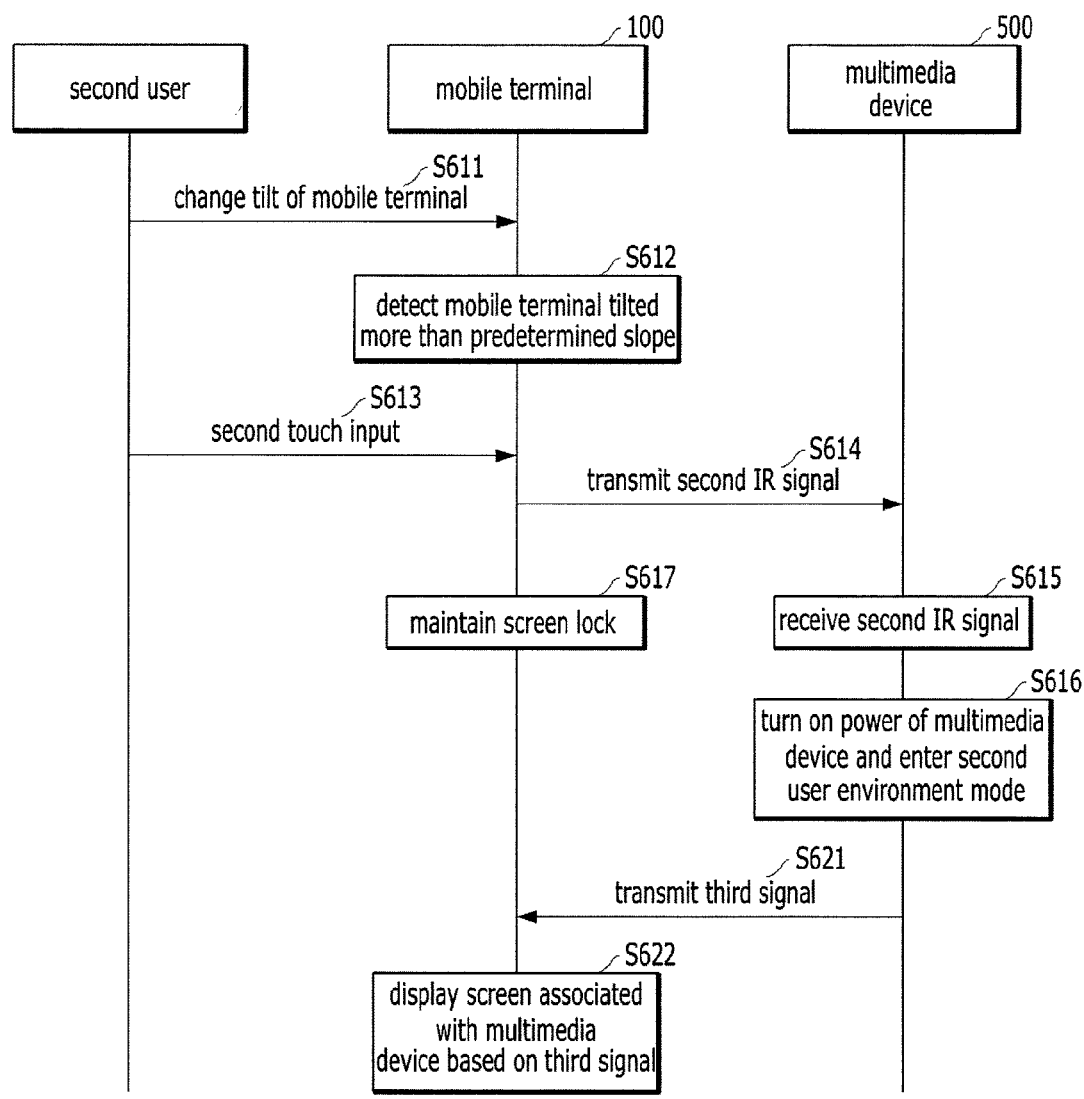
FIG. 9 is a flowchart illustrating a further different example of a method of controlling an external device using a mobile terminal according to one embodiment of the present invention.

Next, FIG. 9 is a flowchart illustrating a different example of a method of controlling an external device using the mobile terminal according to one embodiment of the present invention. Contents overlapped with FIG. 8 are not explained again. In the following description, different points are mainly explained.

The controller 580 turns on the power of the multimedia device 500 based on the received second IR signal and enters a second user environment mode corresponding to the second IR signal (S616). The second IR signal can include first information on a control command configured to turn on the power of the multimedia device 500, second information configured to identify a second user and third information configured to identify the mobile terminal 100. The memory 530 of the multimedia device 500 stores a mapping data between the mobile terminal 100 and a first user corresponding to an owner of the mobile terminal 100 in advance. Hence, the controller 580 can identify that the second IR signal is transmitted from the mobile terminal 100 using the third information included in the second IR signal. In addition, the controller 580 can identify that the second user is not a user of the mobile terminal 100 using the second information included in the second IR signal and the mapping data between the mobile terminal 100 and the first user stored in the memory 530.

The controller 580 can control the network interface unit 513 to transmit a third signal in response to the second IR signal (S621). The third signal can include information on a remote controller UI, which is customized to the second user intending to control the multimedia device 500. The second user can set the information on the remote controller UI customized to the second user in advance in the multimedia device 500. The step S632 can be practically performed at the same time with the step S615 or the step S616. Or, at least a part of the step S632 can be performed by being overlapped with the step S615 or the step S616 in timely manner.

The controller 180 controls the short-range communication module 114 to receive the third signal, activates the display unit 151 based on the third signal and can control the display unit 151 to display a third screen related to the multimedia device 500. As an example, the third signal can be received using at least one selected from the group consisting of Bluetooth™, UWB (Ultra Wideband), ZigBee, NFC (Near Field Communication), Wi-Fi (Wireless-Fidelity), Wi-Fi Direct, Wireless USB (Wireless Universal Serial Bus). According to the present embodiment, if a second touch input is detected when the mobile terminal 100 is tilted more than a predetermined slope, the controller 180 outputs a third screen corresponding to the third signal received from the multimedia device 500. Yet, since a screen lock of the display unit 151 is not cancelled, the second user is unable to use other functions of the mobile terminal 100 except a function of a remote controller application corresponding to the third screen.

Next, FIG. 10 is a diagram illustrating examples of an IR signal transmitted to an external device from a mobile terminal according to one embodiment of then present invention. FIG. 10 (a) is firstly explained as an example of an IR signal transmitted to the multimedia device 500 from the mobile terminal 100 according to one embodiment of the present invention.

When controlling the multimedia device 500 using a dedicated remote controller of the multimedia device 500 or when controlling the multimedia device 500 by executing a remote controller application installed in the mobile terminal 100 using a general method, assume that an IR signal corresponding to a command configured to turn on power of the multimedia device 500 includes a code value of 0x00.

According to one embodiment of the present invention, if the mobile terminal 100 tilted more than a predetermined slope and a touch input corresponding to a specific user are detected, an IR signal, which is transmitted to the multimedia device 500 from the mobile terminal 100 to turn on the power of the multimedia device 500, can include first information on a control command configured to turn on the power of the multimedia device 500 and second information configured to identify the specific user. As an example, if the tilt of the mobile terminal 100 and a first touch input corresponding to a first user are detected, a first IR signal, which is transmitted to the multimedia device 500 from the mobile terminal 100 to turn on the power of the multimedia device 500, can include first information 701 on a control command configured to turn on the power of the multimedia device 500 and second information 702 configured to identify the first user.

In this instance, the second information 702 included in the first IR signal can be determined in relation to the first touch input. Similarly, if the tilt of the mobile terminal 100 and a second touch input corresponding to a second user are detected, a second IR signal, which is transmitted to the multimedia device 500 from the mobile terminal 100 to turn on the power of the multimedia device 500, can include first information 701 on a control command configured to turn on the power of the multimedia device 500 and second information 703 configured to identify the second user. In this instance, the second information 703 included in the second IR signal can be determined in relation to the second touch input. The memory 170 of the mobile terminal 100 and the memory 530 of the multimedia device 500 can store such a list as shown in FIG. 10 (a) in advance.

FIG. 10 (b) is explained as an example of an IR signal transmitted to the multimedia device 500 from the mobile terminal 100 according to one embodiment of the present invention. When controlling the multimedia device 500 using a dedicated remote controller of the multimedia device 500 or when controlling the multimedia device 500 by executing a remote controller application installed in the mobile terminal 100 using a general method, assume that an IR signal corresponding to a command configured to turn on power of the multimedia device 500 includes a code value of 0x00.

According to one embodiment of the present invention, if the mobile terminal 100 tilted more than a predetermined slope and a touch input corresponding to a specific user are detected, an IR signal, which is transmitted to the multimedia device 500 from the mobile terminal 100 to turn on the power of the multimedia device 500, can include first information on a control command configured to turn on the power of the multimedia device 500, second information configured to identify the specific user and third information configured to identify the mobile terminal 100. In the present embodiment, assume that an owner of a first mobile terminal 100 corresponds to a first user and an owner of a second mobile terminal corresponds to a second user.

As an example, if the tilt of the first mobile terminal 100 and a first touch input corresponding to a first user are detected, a first IR signal, which is transmitted to the multimedia device 500 from the mobile terminal 100 to turn on the power of the multimedia device 500, can include first information 701 on a control command configured to turn on the power of the multimedia device 500, second information 702 configured to identify the first user and third information 711 configured to identify the first mobile terminal 100. In addition, if the tilt of the first mobile terminal 100 and a second touch input corresponding to a second user are detected, a second IR signal, which is transmitted to the multimedia device 500 from the mobile terminal 100 to turn on the power of the multimedia device 500, can include first information 701 on a control command configured to turn on the power of the multimedia device 500, second information 703 configured to identify the second user and third information 711 configured to identify the first mobile terminal 100.

In addition, if the tilt of the second mobile terminal 100 and a first touch input corresponding to a first user are detected, a second IR signal, which is transmitted to the multimedia device 500 from the mobile terminal 100 to turn on the power of the multimedia device 500, can include first information 701 on a control command configured to turn on the power of the multimedia device 500, second information 701 configured to identify the first user and third information 712 configured to identify the second mobile terminal 100. And, if the tilt of the second mobile terminal 100 and a second touch input corresponding to a second user are detected, a first IR signal, which is transmitted to the multimedia device 500 from the mobile terminal 100 to turn on the power of the multimedia device 500, can include first information 701 on a control command configured to turn on the power of the multimedia device 500, second information 703 configured to identify the second user and third information 712 configured to identify the second mobile terminal 100. The memory 170 of the mobile terminal 100 and the memory 530 of the multimedia device 500 can store such a list as shown in FIG. 10 (b) in advance.

FIG. 11 is a diagram illustrating an example of a database stored in a memory of a multimedia device according to one embodiment of then present invention. Referring to FIG. 11, the memory 530 of the multimedia device 500 can store a mapping data between a specific IR signal and a specific user in advance. Also, the memory 530 can store a user environment corresponding to the specific user mapped to the specific IR signal in advance. Each user can set the user environment in advance in the multimedia device 500. If power of the multimedia device 500 is turned on by an IR signal corresponding to a specific user and a user environment mode corresponding to a specific user environment is entered according to one embodiment of the present invention, a controller 580 of the multimedia device 500 can analyze/store a using pattern of the multimedia device 500 of the corresponding user, service hour of the multimedia device 500 and the like.

According to embodiment, in relation to a user environment of a specific user, if there exists a predetermined restrictive condition set by not the specific user but by a different user, a memory 530 can also store the restrictive condition. As an example, the restrictive condition may correspond to at least one selected from the group consisting of restriction on service hour of the multimedia device 500, restriction on applications capable of being used in the multimedia device 500, restriction on functions capable of being used in the multimedia device 500 and restriction on channels capable of being watched via the multimedia device 500.

Figure 12:
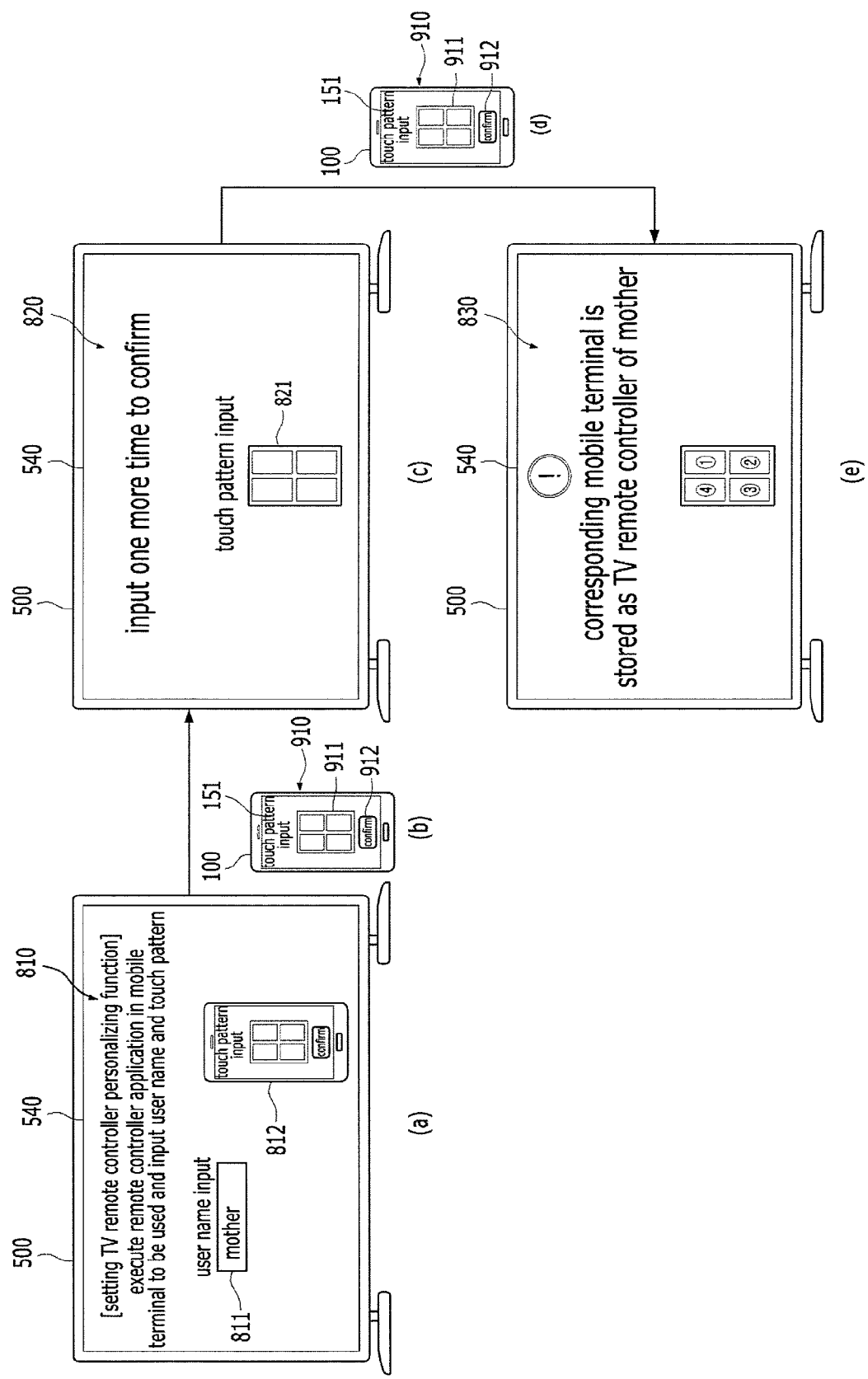
FIG. 12 is a diagram illustrating an example of a method of registering a user of a mobile terminal in a multimedia device according to one embodiment of the present invention.

FIG. 12 is a diagram illustrating an example of a method of registering a user of a mobile terminal in a multimedia device according to one embodiment of then present invention. In the present embodiment, assume that the mobile terminal 100 and the multimedia device 500 are paired with each other to transceive a promised data with each other.

Referring to FIG. 12 (a), a first screen 810 is displayed on the display unit 540 of the multimedia device 500. As an example, the first screen 810 can be output on the display unit 540 by executing an application configured to register a user of the mobile terminal 100 according to one embodiment of the present invention among applications installed in the multimedia device 500. The first screen 810 can include a first area 811 used for inputting a name of a user of the mobile terminal 100 and a second area 812 used for guiding a touch input corresponding to the user. A user can input a name of the user indicating the user in the first area 811 using a remote controller dedicated to the multimedia device 500 or the mobile terminal 100. The second area 812 plays a role of guiding a user to input a predetermined touch pattern using the mobile terminal 100. The user may correspond to a first user who is an owner of the mobile terminal 100. Further, assume that the touch pattern corresponds to a pattern discretely tapping a plurality of points on a screen of the display unit 151 of the mobile terminal according to a predetermined order.

The controller 580 of the multimedia device 500 can control the network interface unit 513 to transmit a first signal corresponding to an input request of a touch pattern to the mobile terminal 100. Referring to FIG. 12 (b), the controller 180 controls the short-range communication module 114 to receive the first signal and can control the display unit 151 to display a second screen 910 configured to receive an input of a touch pattern based on the received first signal. The second screen 910 can include a touch pattern input area 911 on which a whole area of a screen of the display unit 151 is displayed by virtually being divided. As an example, the touch pattern input area 911 includes 4 divided areas and a user can input a touch pattern by sequentially tapping at least one or more divided areas based on a predetermined order.

If a user inputs a touch pattern on the second screen 910 and selects a confirm menu 912, the controller 180 can control the short-range communication module 114 to transmit a second signal to the multimedia device 500 to indicate that the input of the touch pattern is completed. Referring to FIG. 12 (c), the controller 580 controls the network interface unit 513 to receive the second signal and can control the display unit 540 to display a third screen 820 corresponding to the second signal. The third screen 820 can include an area 821 configured to guide a user to input a predetermined touch pattern again using the mobile terminal 100.

Meanwhile, referring to FIG. 12 (d), if a user inputs a touch pattern on the second screen 910 and selects the confirm menu 912, the controller 180 can control the display unit 151 to display a fourth screen 920 configured to receive an input of a touch pattern again. The fourth screen 920 can include a touch pattern input area 921 configured to receive the input of the touch pattern again.

If a user inputs a touch pattern identical to the input touch pattern in the pattern input area 921 and selects a confirm menu 922 in the fourth screen 920, The controller 180 determines whether the touch pattern input again is identical to the touch pattern input mentioned earlier in FIG. 12 (b). If the touch patterns are identical to each other, the controller 180 can generate an IR signal corresponding to the touch pattern. As an example, the IR signal may include first information on a control command configured to turn on power of the multimedia device 500 and second information configured to identify a registered user. Moreover, the IR signal may further include third information configured to identify the mobile terminal 100. The second information can be determined in relation to the input touch pattern. The memory 170 of the mobile terminal 100 can store the input touch pattern and the generated IR signal by mapping the input touch pattern and the generated IR signal to each other.

The controller 180 can control the short-range communication module 114 to transmit a third signal including the generated IR signal to the multimedia device 500. Referring to FIG. 12 (e), The controller 580 controls the network interface unit 513 to receive the third signal and can control a memory 530 to store the input user name mentioned earlier in FIG. 12 (a) and the IR signal included in the received third signal by mapping the user name and the IR signal to each other.

In addition, if an IR signal corresponding to a specific touch input is generated irrespective of a user and the power of the multimedia device 500 is turned on by the generated IR signal only, one embodiment of the present invention can be configured in a manner that prescribed users, who are aware of the specific touch input, can use the multimedia device 500 only.

Next, FIG. 13 is a diagram illustrating an example of screens displayed on a display unit of a multimedia device and a display unit of a mobile terminal, respectively, when a slope greater than a predetermined slope and a predetermined touch input are detected in the mobile terminal according to one embodiment of the present invention.

Referring to FIG. 13 (a), a first user tilts the mobile terminal 100 toward the multimedia device 500 and inputs a predetermined first touch input when the display unit 151 of the mobile terminal 100 is inactivated. The controller 180 controls the sensing unit 140 to detect that the mobile terminal 100 is tilted more than a predetermined slope and detects the first touch input received via the inactivated display unit 151 when the mobile terminal 100 is tilted more than the predetermined slope.

The controller 180 controls the short-range communication module 114 to transmit a predetermined first IR signal. As an example, the first IR signal can include first information on a control command configured to turn on the power of the multimedia device 500 and second information configured to identify the first user. The first IR signal can be transmitted via an IR signal transmitting unit included in the short-range communication module 114 according to an infrared communication protocol.

The controller 580 of the multimedia device 500 turns on the power of the multimedia device 500 according to the first IR signal and enters a first user environment mode corresponding to the first IR signal. Also, the controller 580 can control the display unit 540 to display a first screen 1000 corresponding to the first user environment mode. A user environment corresponding to the first user environment mode may be configured in advance by a user or may be configured by the controller 580 by analyzing a using pattern of the multimedia device 500 of the first user after the power of the multimedia device 500 is turned on by the first IR signal according to embodiment.

For instance, the first screen 1000 can include one of a video data 1010 included in a broadcast signal, which is transmitted on a channel most recently watched by the first user, a list 1020 of preferred channels predetermined by the first user and a recording list 1030 of broadcast programs made by the first user. In this instance, the channel most recently watched by the first user indicates a channel watched by the first user immediately before the power of the multimedia device 500 is turned off after the power of the multimedia device 500 is turned on by the first IR signal. The preferred channels predetermined by the first user indicate preferred channels which are configured when the power of the multimedia device 500 is turned on by the first IR signal. The recording list of the broadcast programs made by the first user indicates a list of broadcast programs which are recorded in the state that the power of the multimedia device 500 is turned on by the first IR signal.

Meanwhile, referring to FIG. 13 (b), when a first touch input received via the inactivated display unit 151 is detected when the mobile terminal 100 is tilted more than the predetermined slope, and if the detected first touch input is matched with a password, which is stored in the memory 170 used for cancelling a screen lock of the display unit 150, the controller 180 activates the display unit 151, cancels the screen lock of the display unit 151 and controls the display unit 151 to display a second screen 1100 associated with the multimedia device 500 corresponding to the first IR signal.

The second screen 1100 can include a remote controller UI customized to the first user intending to control the multimedia device 500. In particular, if the first touch input is detected, the controller 180 executes a remote controller application stored in the memory 170 and can output the second screen 1100 including the remote controller UI, which is customized to the first user intending to control the multimedia device 500, on the display unit 151. The first user executes the remote controller application stored in the memory 170 and can set the remote controller UI customized to the first user in advance. As an example, among functions of the multimedia device 500, the remote controller UI included in the second screen 1100 may include a menu button corresponding to a frequently used function of the first user only. Or, among the functions of the multimedia device 500, a size of the menu button corresponding to the frequently used function of the first user may be bigger than a size of a menu button corresponding to a different function.

Next, FIG. 14 is a diagram illustrating a different example of a screen displayed on a display unit of a multimedia device when a predetermined IR signal is transmitted to the multimedia device from a mobile terminal according to one embodiment of the present invention. FIG. 14 (*a*) is a diagram illustrating an example of a first screen 1210 displayed on the display unit 540 when the power of the multimedia device 500 is turned on according to a general method and FIG. 14 (*b*) is a diagram illustrating an example of a second screen 1220 displayed on the display unit 540 when the power of the multimedia device 500 is turned on by a specific IR signal transmitted from the mobile terminal 100 according to one embodiment of the present invention. In the present embodiment, assume that the multimedia device 500 is equipped with not only a broadcast receiving function but also a function supporting the internet.

Referring to FIG. 14 (*a*), if the power of the multimedia device 500 is turned on according to a general method, the first screen 1210 corresponding to a main home screen can be displayed on the display unit 540. As an example, the first screen 1210 can include a first area 1211 outputting a video data of a broadcast program currently transmitted on a specific channel, a second area 1212 including icons of menus capable of being used in the multimedia device 500, a third area 1213 including icons of contents capable of being used via the multimedia device 500, a fourth area 1214 including icons of applications installed in the multimedia device 500, an advertising area 1215 and the like.

Meanwhile, referring to FIG. 14 (*b*), if the power of the multimedia device 500 is turned on by a specific IR signal transmitted from the mobile terminal 100 according to one embodiment of the present invention, the controller 580 enters a user environment mode of a specific user corresponding to the specific IR signal and can output a second screen 1220 corresponding to the user environment mode on the display unit 540. The second screen 1220 can include one or more of a video data included in a broadcast signal, which is transmitted on a most recently watched channel by a specific user, icons of menus/contents used by the specific user more than a predetermined number among menus/contents capable of being used by the multimedia device 500, icons respectively corresponding to applications installed by the specific user, icons respectively corresponding to applications used by the specific user more than a predetermined number and UI corresponding to functions used by the specific user more than a prescribed number among functions of the multimedia device 500.

As an example, referring to FIG. 14 (*b*), the second screen 1220 can include a first area 1221 including a broadcast signal, which is transmitted on a most recently watched channel by a specific user, a second area 1222 including icons of menus/contents used by the specific user more than a predetermined number and a third area 1223 including icons of applications used by the specific user more than a predetermined number. A composition of the second screen 1220 can be configured and changed by the specific user.

Figure 15:
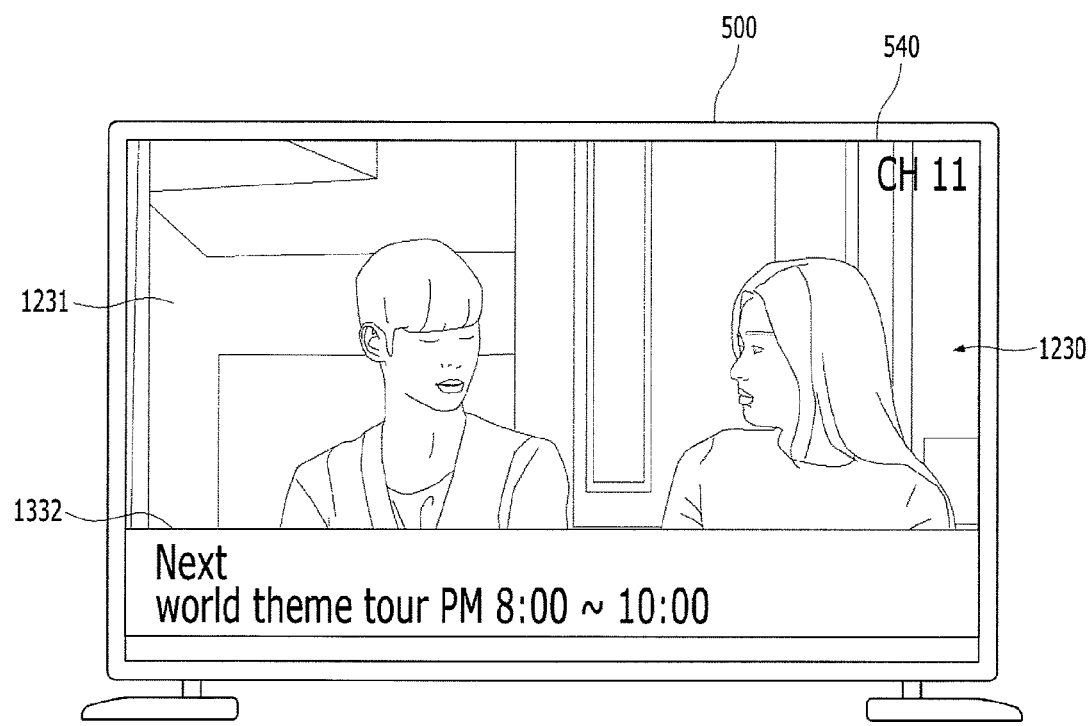
FIG. 15 is a diagram illustrating a different example of a screen displayed on a display unit of a multimedia device when a predetermined IR signal is transmitted to the multimedia device from a mobile terminal according to one embodiment of the present invention.

Next, FIG. 15 is a diagram illustrating a different example of a screen displayed on a display unit of a multimedia device when a predetermined IR signal is transmitted to the multimedia device from a mobile terminal according to one embodiment of the present invention. If the power of the multimedia device 500 is turned on by a specific IR signal transmitted from the mobile terminal 100 according to one embodiment of the present invention, the controller 580 enters a user environment mode corresponding to the specific IR signal and can display a first screen 1230 corresponding to the user environment mode on the display unit 540. As an example, the user environment mode may be associated with a size of one or more of a letter, a sign, a number and an icon displayed on a display unit 151.

According to one embodiment, a specific user corresponding to the specific IR signal can directly set a size of one or more of a letter, a sign, a number and an icon displayed on the display unit 151. Or, if an age of the specific user corresponding to the IR signal is older than a predetermined age, the controller 580 can increase the size of one or more of a letter, a sign, a number and an icon displayed on the display unit 151 to make the size to be bigger than a predetermined size. If the multimedia device 500 enters the user environment mode, the size of one or more of a letter, a sign, a number and an icon displayed on the display unit 151 can be maintained in the predetermined size until the power of the multimedia device 500 is turned off.

As an example, the first screen 1230 can include a video data 1231 included in a broadcast signal, which is transmitted on a channel most recently watched by a specific user corresponding to the specific IR signal. If the specific user selects an EPG information watch menu, EPG information 1332 including broadcast information of the corresponding channel is output on the first screen 1230. One or more of a letter, a sign, a number and an icon included in the EPG information 1332 can be displayed on the EPG information in a predetermined size according to the entered user environment mode.

Figure 16:
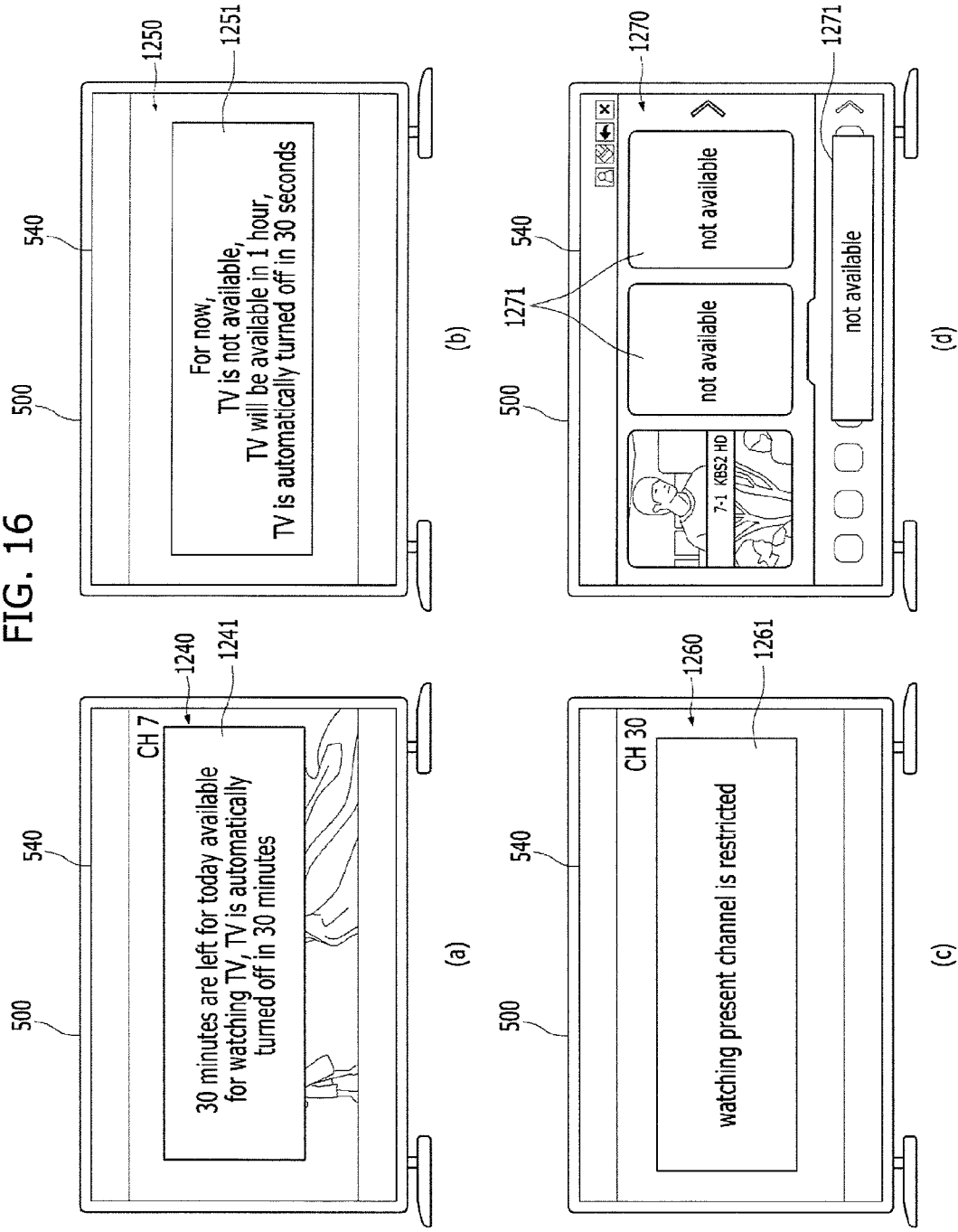
FIG. 16 is a diagram illustrating a further different example of a screen displayed on a display unit of a multimedia device when a predetermined IR signal is transmitted to the multimedia device from a mobile terminal according to one embodiment of the present invention.

FIG. 16 is a diagram illustrating a different example of a screen displayed on a display unit of a multimedia device when a predetermined IR signal is transmitted to the multimedia device from a mobile terminal according to one embodiment of the present invention. If the power of the multimedia device 500 is turned on by a specific IR signal transmitted from the mobile terminal 100 according to one embodiment of the present invention, the controller 580 enters a first user environment mode of a first user corresponding to the specific IR signal and can display a screen corresponding to the first user environment mode on a display unit. According to one embodiment, if there is a restrictive condition predetermined by a second user different from the first user, the controller 580 can control the display unit 540 to display a screen corresponding to the restrictive condition in the first user environment mode. As an example, the first user may correspond to a child and the second user may correspond to parents of the first user. In addition, according to one embodiment, if the first user environment mode collides the restrictive condition, the restrictive condition can be preferentially applied.

For instance, the predetermined restrictive condition may be associated with one or more of restriction on a service hour of the multimedia device 500, restriction on applications capable of being used in the multimedia device 500, restriction on functions capable of being used in the multimedia device 500 and restriction on channels capable of being watched via the multimedia device 500.

Referring to FIG. 16 (*a*), if restriction on service hour of the multimedia device 500 is configured as a restrictive condition, the controller 580 can control the display unit 540 to display a first screen 1240 corresponding to the restrictive condition. In this instance, the restriction on the service hour may indicate that there exists restriction on time capable of maximally using the multimedia device after the power of the multimedia device 500 is turned on. The first screen 1240 can include a guide message 1241 including information on remaining service hours of the multimedia device 500 and information on timing on which the power of the multimedia device 500 is turned off. The first screen 1240 can be output on the display unit 540 when the restriction on the service hour of the multimedia device 500 is configured by a second user different from a first user as a predetermined condition and predetermine time elapses after the power of the multimedia device 500 is turned on according to the specific IR signal.

Referring to FIG. 16 (*b*), restriction on a service hour of the multimedia device 500 is configured as a restrictive condition, the controller 580 can control the display unit 540 to display a first screen 1250 corresponding to the restrictive condition. In this instance, the restriction on the service hour may indicate that there is a restriction on a time slot capable of using the multimedia device 500 after the power of the multimedia device 500 is turned on. The first screen 1250 can include a guide message 1251 including information on not available service hours of the multimedia device 500 and information on timing on which the power of the multimedia device 500 is turned off. The first screen 1250 can be output on the display unit 540 when the restriction on the service hour of the multimedia device 500 is configured by a second user different from a first user as a predetermined condition and current time is not the service hour of the multimedia device 500 although the power of the multimedia device 500 is turned on according to the specific IR signal.

Referring to FIG. 16 (*c*), if restriction on a channel capable of being watched is configured as a restrictive condition, the controller 580 can control the display unit 540 to display a first screen 1260 corresponding to the restrictive condition. The first screen 1260 may include a notification message 1261 notifying that watching the corresponding channel is restricted. The first screen 1260 can be output on the display unit 540 when restriction on a channel capable of being watched via the multimedia device 500 is configured by a second user different from a first user as a predetermined condition and the first user changes a channel to a channel incapable of being watched.

Referring to FIG. 16 (*d*), if restriction on an application capable of being used in the multimedia device 500 and/or restriction on a function capable of being used in the multimedia device 500 is configured as a restrictive condition, the controller 580 can control the display unit 540 to display a first screen 1270 corresponding to the restrictive condition. The first screen 1270 can include an indicator 1271 indicating that there exists an application and/or a function restricted by the restrictive condition. Or, the first screen can display an icon corresponding to the application and/or the function restricted by the restrictive condition in an inactivated state. The first screen 1270 can be output on the display unit 540 when restriction on an application and/or a function capable of being used in the multimedia device 500 is configured by a second user different from a first user as a predetermined condition and the power of the multimedia device 500 is turned on according to the specific IR signal.

Figure 17:
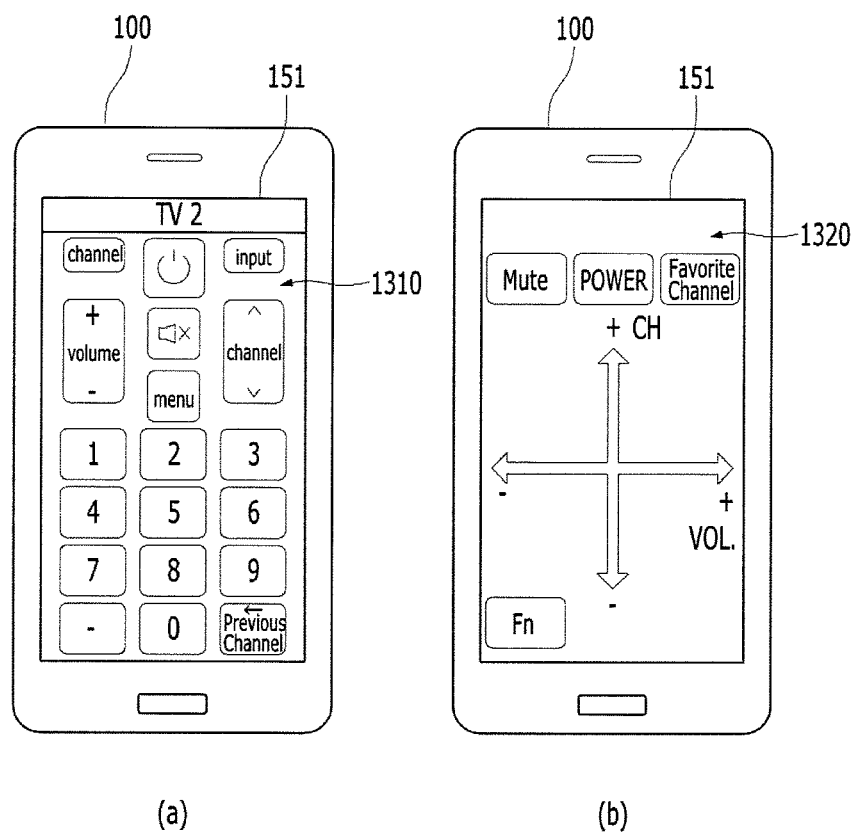
FIG. 17 is a diagram illustrating an example of a screen output on a display unit of a mobile terminal when a second user of the mobile terminal intends to control a multimedia device using the mobile terminal according to one embodiment of the present invention.

FIG. 17 is a diagram illustrating an example of a screen output on a display unit of a mobile terminal when a second user of the mobile terminal intends to control a multimedia device using the mobile terminal according to one embodiment of the present invention. In particular, FIG. 17 explains a second user instead of a first user corresponding to an owner of the mobile terminal 100 intends to control the multimedia device 500 using the mobile terminal 100 of the first user. As mentioned earlier with reference to FIG. 8 and FIG. 9, the controller 180 detects the mobile terminal 100 tilted more than a predetermined slope and a second touch input corresponding to the second user. Also, the controller 180 controls the short-range communication module 114 to transmit a predetermined second IR signal corresponding to the second touch input to the multimedia device 500.

Meanwhile, referring to FIG. 17 (*a*), the controller 180 activates the display unit 151 and can control the display unit 151 to display a first screen 1310 associated with the multimedia device 500 in response to the second IR signal. In this instance, since the second touch input is not matched with a password used for cancelling a screen lock of the display unit 150, the controller activates the display unit 151 and can output the first screen 1310 on the display unit 151 while maintaining the screen lock of the display unit 150. The first screen 1310 can include a remote controller UI to control the multimedia device 500. According to one embodiment, if a remote controller UI, which is customized to the second user, intending to control the multimedia device 500 is stored in the memory 170, the first screen 1310 can include the remote controller customized to the second user. If the remote controller UI, which is customized to the second user, intending to control the multimedia device 500 is not stored in the memory 170, the first screen 1310 can include a general remote controller UI associated with the multimedia device 500.

Referring to FIG. 17 (*b*), the controller 180 controls the short-range communication module 114 to receive a first signal transmitted from the multimedia device 500 in response to the second IR signal, activates the display unit 151 based on the first signal and can control the display unit 151 to display a second screen 1320 associated with the multimedia device 500. The first signal can include information on a remote controller UI customized to the second user intending to control the multimedia device 500. The second user can configure the information on the remote controller UI customized to the second user in advance in the multimedia device 500. In this instance, since the second touch input is not matched with a password used for cancelling a screen lock of a display unit 150, the screen lock of the display unit 150 can be maintained.

In FIG. 7 to FIG. 17, the IR signal transmitting unit included in the short-range communication module 114 is activated when the mobile terminal 100 tilted more than a predetermined slope and a specific touch input are detected or the IR signal transmitting unit included in the short-range communication module 114 is always maintained in an activated state. On the contrary, the mobile terminal 100 can be implemented in a manner that the IR signal transmitting unit is activated when a different prescribed condition is satisfied. Regarding this, it shall be described with reference to FIG. 18 in the following.

FIG. 18 is a diagram illustrating activation timing of an IR signal transmitting unit included in a mobile terminal according to one embodiment of the present invention. As an example, referring to FIG. 18 (*a*), the controller 180 of the mobile terminal 100 maintains an inactivated state of an IR signal transmitting unit included in a short-range communication module 114. The controller can activate the IR signal transmitting unit when the controller 180 detects that the mobile terminal 100 is titled more than a predetermined slope. In particular, if the mobile terminal 100 tilted more than the predetermined slope is detected, the controller 180 can activate the IR signal transmitting unit although a specific touch input is not detected. Further, if the specific touch input is detected, the controller 180 can transmit a specific IR signal via the activated IR signal transmitting unit.

As a different example, referring to FIG. 18 (*b*), the controller 180 of the mobile terminal 100 maintains an inactivated state of an IR signal transmitting unit included in the short-range communication module 114. If the controller 180 detects a specific touch input and then detects that the mobile terminal 100 is tilted more than a predetermined slope, the controller can activate the IR signal transmitting unit when the controller detects the mobile terminal 100 tilted more than the predetermined slope. In particular, FIG. 18 (b) corresponds to when the controller 180 preferentially detects a specific touch input and then detects the mobile terminal 100 tilted more than the predetermined slope. If the mobile terminal 100 tilted more than the predetermined slope is detected after the specific touch input is detected, the controller 180 activates the IR transmitting unit at the time of detecting the mobile terminal titled more than the predetermined slope and can transmit a specific IR signal via the activated IR transmitting unit.

Figure 19:
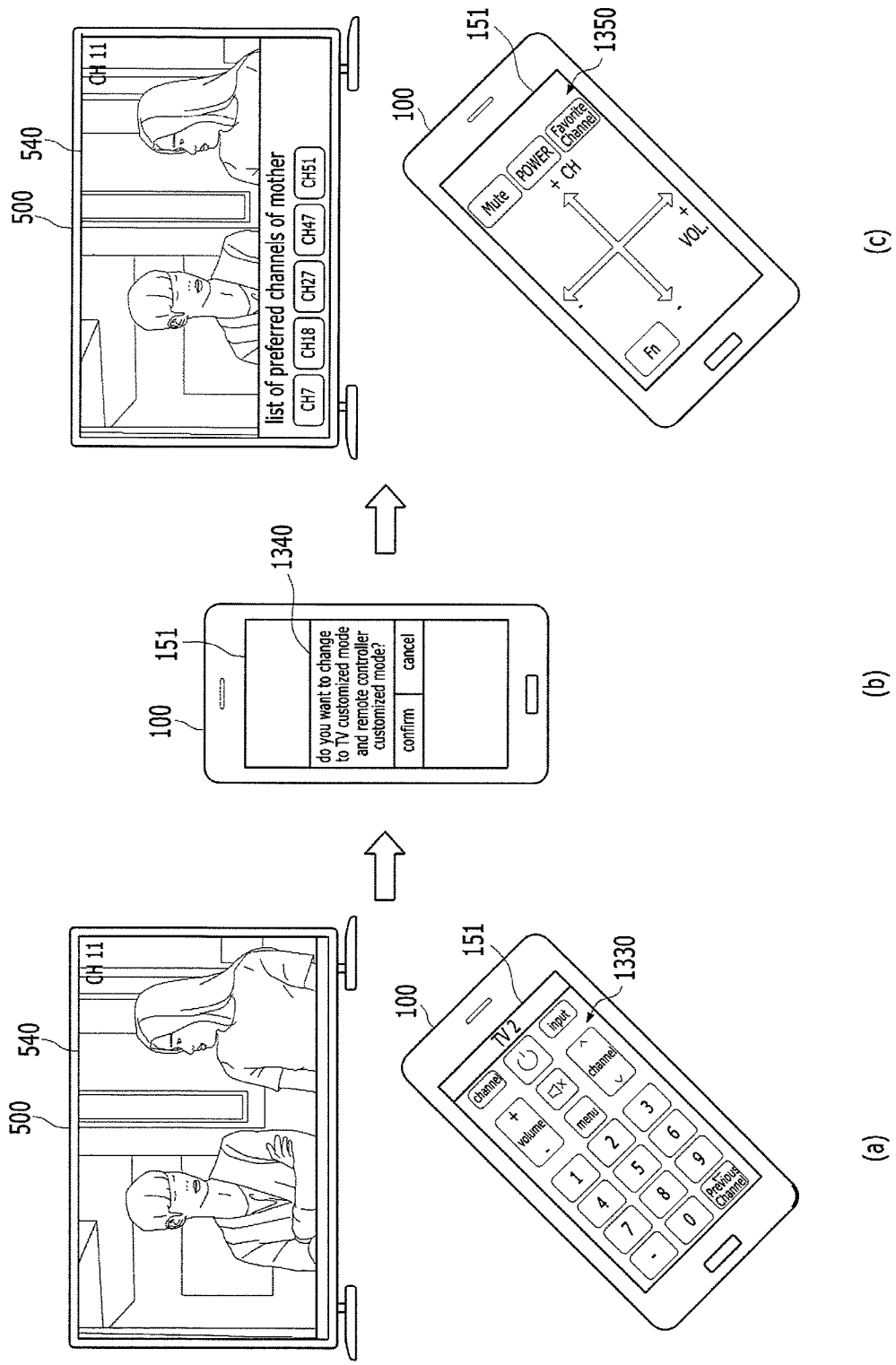
FIG. 19 is a diagram illustrating an example of a method of outputting a user customized screen on a display unit of a mobile terminal and a display unit of a multimedia device according to one embodiment of the present invention.

FIG. 19 is a diagram illustrating an example of a method of outputting a user customized screen on a display unit of a mobile terminal and a display unit of a multimedia device according to one embodiment of the present invention. According to FIG. 7 to FIG. 18, if the mobile terminal 100 tilted more than a predetermined slope and a specific touch input are detected when the display unit 151 of the mobile terminal is inactivated, a user customized screen can be displayed on the display unit 151 of the mobile terminal and the display unit 540 of the multimedia device 500.

On the contrary, FIG. 19 explains an example that a user customized screen is displayed on the display unit 151 of the mobile terminal 100 and the display unit 540 of the multimedia device 500 when the multimedia device 500 and the mobile terminal 100 are used in a general state. In this instance, as shown in FIG. 19 (a), the general state of using the multimedia device 500 and the mobile terminal 100 may correspond to when the multimedia device 500 does not enter a user environment mode of a specific user and the mobile terminal 100 outputs a first screen 1330 corresponding to a remote controller UI associated with the multimedia device 500 on the display unit 151 by executing a remote controller application using a general method.

Referring to FIG. 19 (b), if a user selects a menu corresponding to a specific function displayed on the first screen 1330, the controller 180 can control the display unit 151 to display a second screen 1340. In this instance, the specific function may correspond to a function that makes a user customized screen to be displayed on the display unit 151 of the mobile terminal 100 and the display unit 540 of the multimedia device 500 according to one embodiment of the present invention. The second screen 1340 may include a guide message checking whether the mobile terminal 100 and the multimedia device 500 are changed to a user customized mode.

Referring to FIG. 19 (c), if a user selects a confirm menu included in the guide message of the second screen 1340, the controller 180 can control the short-range communication module 114 to transmit information capable of identifying a user of the mobile terminal 100 to the multimedia device 500. Also, the controller 580 can enter a user environment mode corresponding to the user based on the information capable of identifying the user of the mobile terminal 100. In addition, the controller 180 can control the display unit 151 to display a third screen 1350 including a remote controller UI, which is stored in the memory 170, customized to the user.

Meanwhile, according to one embodiment of the present invention, expense payment for a charged content provided by the multimedia device 500 or adult authentication for an adult content can be performed by inputting a predetermined touch input corresponding to a user on a display unit 151 of the mobile terminal 100. This will be described with reference to FIG. 20 to FIG. 23 in the following.

Figure 20:
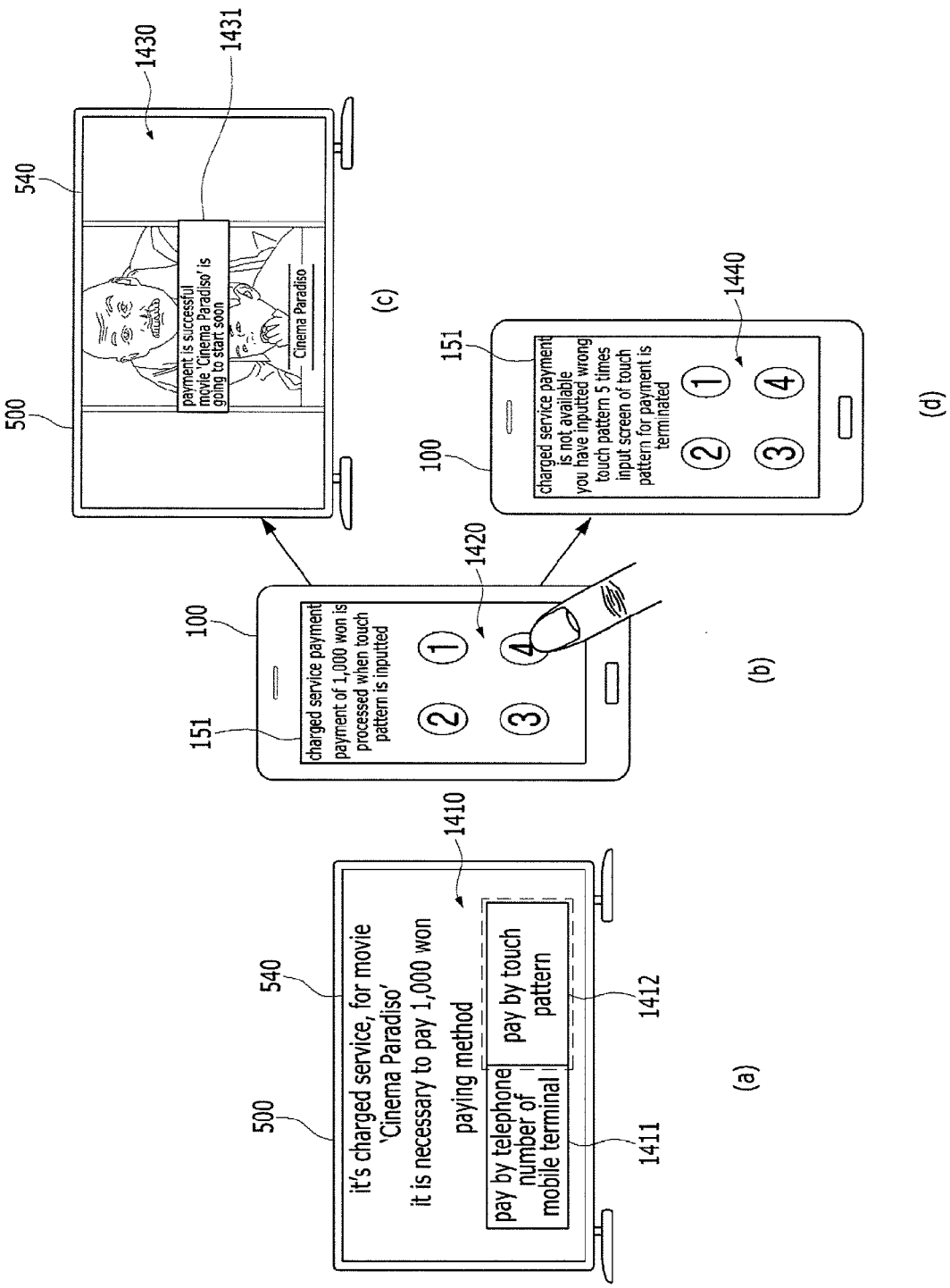
FIG. 20 is a diagram illustrating an example of a method of paying expense for a charged content provided by a multimedia device by inputting a predetermined touch input corresponding to a user on a display unit of a mobile terminal according to one embodiment of the present invention.

FIG. 20 is a diagram illustrating an example of a method of paying expense for a charged content provided by a multimedia device by inputting a predetermined touch input corresponding to a user on a display unit of a mobile terminal according to one embodiment of the present invention. If a first user of the mobile terminal 100 selects watching of a first charged content provided by the multimedia device 500 using the mobile terminal 100 as a remote controller, as shown in FIG. 20 (a), a first screen 1410 can be displayed on the display unit 540 of the multimedia device 500. As an example, the first screen 1410 can include a first menu option 1411 used for paying expense using a telephone number of the mobile terminal 100 and a second menu option 1412 used for paying expense using a first touch input corresponding to a first user as a method of paying expense for watching the first charged content.

If the first user selects the second menu option 1412 of the first screen 1410, the controller 580 of the multimedia device 500 can control the network interface unit 513 to transmit a first signal including information necessary for paying expense for watching the first charged content to the mobile terminal 100 using a first touch input.

Referring to FIG. 20 (b), the controller 180 can control the display unit 151 to display a second screen 1420 inducing the first touch input to pay the expense for watching the first charged content based on the first signal. If the first touch input received via the second screen 1420 is detected, the controller 180 determines whether the detected first touch input is matched with a password used for cancelling a screen lock of the display unit 151. If the detected first touch input is matched with the password used for cancelling the screen lock of the display unit 151, the controller performs a process for the expense payment and can control the short-range communication module 114 to transmit a second signal to the multimedia device 500 to notify that the payment is successful.

In addition, as shown in FIG. 20 (c), the controller 580 can control the display unit 151 to display a third screen 1430 including a guide message 1431 based on the second signal to indicate that the expense payment for the first charged content is successfully completed. On the contrary, if the first touch input is not matched with the password used for cancelling the screen lock of the display unit 151 for more than a predetermined number, as shown in FIG. 20 (d), the controller 180 can control the display unit 151 to display a fourth screen 1440 to indicate that a procedure for the expense payment is terminated.

Meanwhile, according to one embodiment of the present invention, if a first user of the mobile terminal 100 is underage, expense payment for watching a charged content can be restricted irrespective of whether a user intending to control the multimedia device 500 actually using the mobile terminal 100 corresponds to a first user or a second user (irrespective of whether a user intending to control the multimedia device 500 using the mobile terminal 100 corresponds to an adult). This feature will now be described with reference to FIG. 21.

Figure 21:
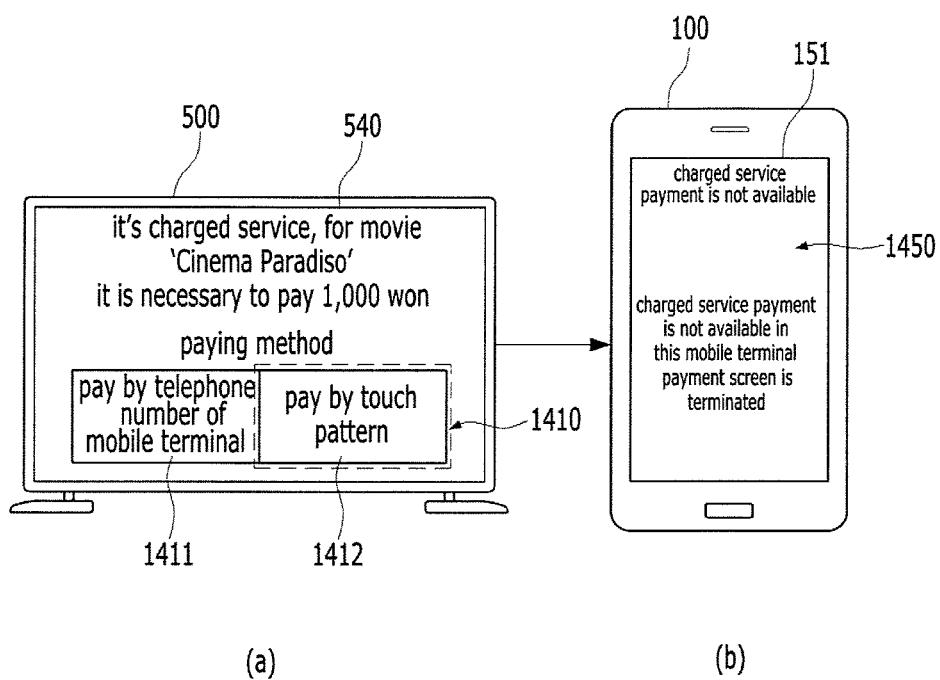
FIG. 21 is a diagram illustrating an example of restricting expense payment when intending to pay an expense for a charged content provided by a multimedia device by inputting a predetermined touch input corresponding to a user on a display unit of a mobile terminal according to one embodiment of the present invention.

In particular, FIG. 21 is a diagram illustrating an example of restricting expense payment when intending to pay an expense for a charged content provided by a multimedia device by inputting a predetermined touch input corresponding to a user on a display unit of a mobile terminal according to one embodiment of the present invention. According to the embodiment of FIG. 21, when a first user, an owner of the mobile terminal 100, is underage, a second user, who is an adult, intends to pay expense for a charged content via a touch input using the mobile terminal 100 owned by the first user.

As mentioned earlier with reference to FIG. 8 and FIG. 9, FIG. 21 is explained under an assumption that the mobile terminal 100 tilted more than a predetermined slope and a second touch input corresponding to the second user are detected when the display unit 151 of the mobile terminal 100 owned by the first user is inactivated and a second IR signal corresponding to the second user is transmitted to the multimedia device 500. Assume that the second IR signal includes first information on a control command configured to turn on power of the multimedia device 500, second information configured to identify the second user and third information configured to identify the mobile terminal 100.

If the second user of the mobile terminal 100 selects watching a first charged content provided by the multimedia device 500 using the mobile terminal 100 as a remote controller, as shown in FIG. 21 (a), a first screen 1410 can be displayed on the display unit 540 of the multimedia device 500. As an example, the first screen 1410 can include a first menu option 1411 used for paying expense using a telephone number of the mobile terminal 100 and a second menu option 1412 used for paying expense using a first touch input corresponding to the first user as a method of paying expense for watching the first charged content.

If the second user selects the second menu option 1412 of the first screen 1410, the controller 580 can identify that the mobile terminal 100 is currently used as a remote controller to control the multimedia device 500 based on the third information included in the second IR signal. If the first user of the mobile terminal 100 is underage or the mobile terminal 100 corresponds to a mobile terminal of which expense payment is restricted, the controller 580 can control the network interface unit 513 to transmit a first signal including information to the mobile terminal 100 to indicate that expense payment is not available. Referring to FIG. 21 (b), the controller 180 can control the display unit 151 to display a second screen 1450 to indicate that the expense payment for the first charged content is not available.

Figure 22:
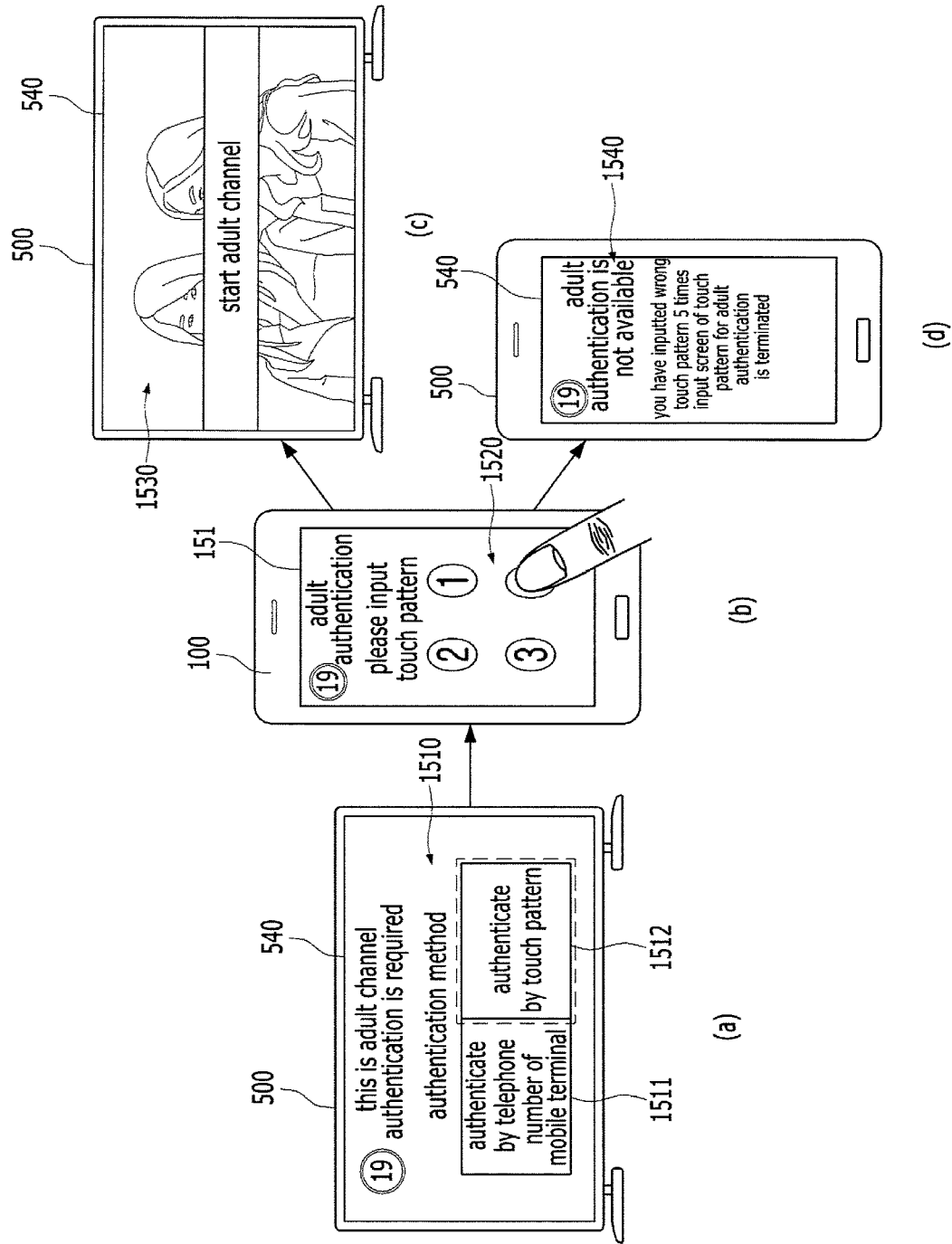
FIG. 22 is a diagram illustrating an example of a method of authenticating an adult for an adult content provided by a multimedia device by inputting a predetermined touch input corresponding to a user on a display unit of a mobile terminal according to one embodiment of the present invention.

FIG. 22 is a diagram illustrating an example of a method of authenticating an adult for an adult content provided by a multimedia device by inputting a predetermined touch input corresponding to a user on a display unit of a mobile terminal according to one embodiment of the present invention. If a first user of the mobile terminal 100 selects watching of a first adult content provided by the multimedia device 500 using the mobile terminal 100 as a remote controller, as shown in FIG. 22 (a), a first screen 1510 can be displayed on the display unit 540 of the multimedia device 500.

As an example, the first screen 1510 can include a first menu option 1511 configured to authenticate using a telephone number of the mobile terminal 100 and a second option 1512 configured to authenticate using a first touch input corresponding to the first user as a method of authenticating an adult for the watching of the first adult content. If the first user selects the second menu option 1512 of the first screen 1510, the controller 580 of the multimedia device 500 can control a network interface unit 513 to transmit a first signal including information necessary for authenticating adult for the first adult content to the mobile terminal 100.

Referring to FIG. 22 (b), the controller 180 of the mobile terminal 100 can control the display unit 151 to display a second screen 1520 inducing the first touch input to authenticate adult for the watching of the first adult content based on the first signal. If the first touch input received via the second screen 1520 is detected, the controller 180 determines whether the detected first touch input is matched with a password used for cancelling a screen lock of the display unit 151. If the detected first touch input is matched with the password used for cancelling the screen lock of the display unit 151, the controller performs a process for the adult authentication and can control the short-range communication module 114 to transmit a second signal to the multimedia device 500 to indicate that the adult authentication is successful.

As shown in FIG. 22 (c), the controller 580 can control the display unit 151 to display a third screen 1530 based on the second signal to indicate that the adult authentication for the watching of the first adult content is successfully completed. On the contrary, if the detected first touch input is not matched with the password used for cancelling the screen lock of the display 151 for more than a predetermined number, as shown in FIG. 22 (d), the controller 180 can control the display unit 151 to display a fourth screen 1540 to indicate that a procedure for the adult authentication is terminated.

Meanwhile, according to one embodiment of the present invention, if a first user of the mobile terminal 100 is underage, expense payment for watching a charged content can be restricted irrespective of whether a user intending to control the multimedia device 500 actually using the mobile terminal 100 corresponds to a first user or a second user (irrespective of whether a user intending to control the multimedia device 500 using the mobile terminal 100 corresponds to an adult). Regarding this, it shall be described with reference to FIG. 23 in the following.

Figure 23:
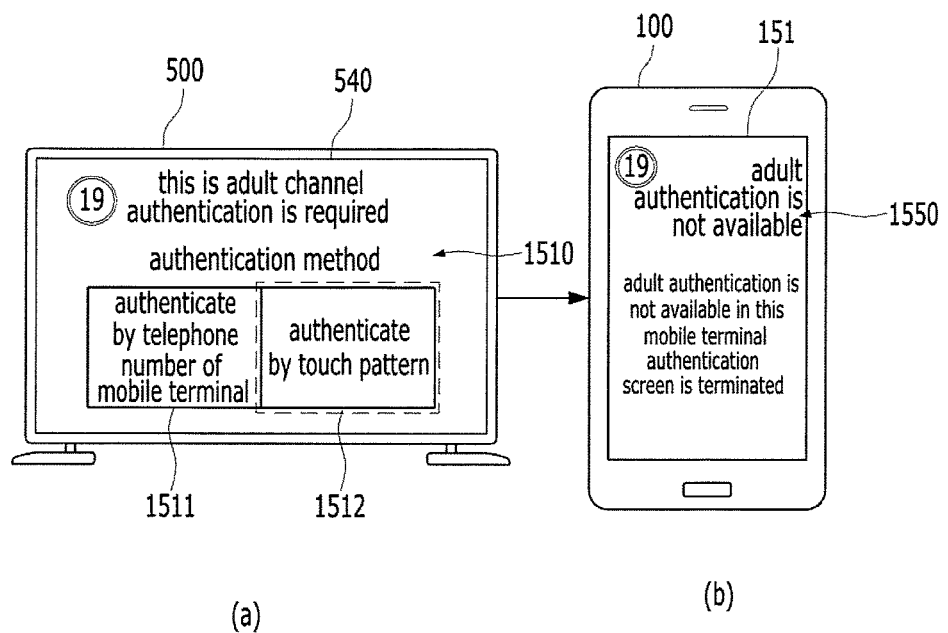
FIG. 23 is a diagram illustrating an example of restricting adult authentication when intending to authenticate an adult for an adult content provided by a multimedia device by inputting a predetermined touch input corresponding to a user on a display unit of a mobile terminal according to one embodiment of the present invention.

In particular, FIG. 23 is a diagram illustrating an example of restricting adult authentication when intending to authenticate an adult for an adult content provided by a multimedia device by inputting a predetermined touch input corresponding to a user on a display unit of a mobile terminal according to one embodiment of the present invention.

According to the embodiment of FIG. 23, when a first user, an owner of the mobile terminal 100, is underage, a second user, who is an adult, intends to perform adult authentication for an adult content via a touch input using the mobile terminal 100 owned by the first user. In addition, as mentioned earlier with reference to FIG. 8 and FIG. 9, FIG. 23 is explained under an assumption that the mobile terminal 100 tilted more than a predetermined slope and a second touch input corresponding to the second user are detected when a display unit 151 of the mobile terminal 100 owned by the first user is inactivated and a second IR signal corresponding to the second user is transmitted to a multimedia device 500. Assume that the second IR signal includes first information on a control command configured to turn on power of the multimedia device 500, second information configured to identify the second user and third information configured to identify the mobile terminal 100.

If the second user of the mobile terminal 100 selects watching a first adult content provided by the multimedia device 500 using the mobile terminal 100 as a remote controller, as shown in FIG. 23 (a), a first screen 1510 can be displayed on the display unit 540 of the multimedia device 500. As an example, the first screen 1510 can include a first menu option 1511 used for authenticating using a telephone number of the mobile terminal 100 and a second menu option 1412 used for authenticating using a first touch input corresponding to the first user as a method of performing adult authentication to watch the first adult content.

If the second user selects the second menu option 1512 of the first screen 1510, the controller 580 of the multimedia device 500 can identify that the mobile terminal 100 is currently used as a remote controller to control the multimedia device 500 based on the third information included in the second IR signal. If the first user of the mobile terminal 100 is underage or the mobile terminal 100 corresponds to a mobile terminal of which adult authentication is restricted, the controller 580 can control the network interface unit 513 to transmit a first signal including information to the mobile terminal 100 to indicate that adult authentication is not available. Referring to FIG. 23 (b), the controller 180 can control the display unit 151 to display a second screen 1550 to indicate that the adult authentication for the first adult content is not available.

Thus, at least one of the embodiments of the present invention provides a user-friendly mobile terminal and a method of controlling an external device using the same by enabling cancelling of a screen lock of the mobile terminal and executing of a remote controller application to be executed at a time. According to at least one of the embodiments of the present invention, when controlling an external device using a mobile terminal, the mobile terminal and the external device provide a user customized environment.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a short-range communication module configured to provide short-range wireless communication;
a touch screen; and
a controller configured to:
deactivate the touch screen and enter the mobile terminal into a lock state,
detect the mobile terminal is tilted more than a predetermined slope,
receive a first touch input on the deactivated touch screen, and
control the short-range communication module to transmit a first IR signal to an external device for controlling the external device when the first touch input matches a predetermined password for unlocking the mobile terminal into an unlocked state,
wherein the controller is further configured to activate the short-range communication unit when the mobile terminal is tilted more than the predetermined slope and the short-range communication module is deactivated.

2. The mobile terminal of claim 1, wherein the controller is further configured to:
activate the deactivated touch screen, unlock the mobile terminal and display a first screen on the touch screen for controlling the external device when the first touch input matches the predetermined password.

3. The mobile terminal of claim 2, wherein the controller is further configured to:
receive a second touch input on the deactivated touch screen,
control the short-range communication module to transmit a second IR signal to the external device,
activate the deactivated touch screen, and
display a second screen on the touch screen for controlling the external device corresponding to the second IR signal while maintaining the lock state of the mobile terminal.

4. The mobile terminal of claim 3, wherein the first screen and the second screen comprise a remote controller user interface for controlling the external device, and
wherein at least a part of the first screen is different from the second screen.

5. The mobile terminal of claim 3, wherein the controller is further configured to:
receive a response signal transmitted from the external device via the short-range communication module in response to the second IR signal, and
display the second screen on the touch screen based on the received response signal.

6. The mobile terminal of claim 5, wherein the second IR signal is transmitted from the short-range communication module according to a first communication protocol, and
wherein the response signal is received by the short-range communication module according to a second communication protocol different from the first communication protocol.

7. The mobile terminal of claim 3, wherein the first IR signal corresponds to a first user, and
wherein the second IR signal corresponds to a second user.

8. The mobile terminal of claim 7, wherein the first user is a primary user of the mobile terminal and the second user is a secondary user of the mobile terminal.

9. The mobile terminal of claim 1, wherein the first IR signal includes a command to power on the external device.

10. A method of controlling a mobile terminal, the method comprising:
deactivating, via a controller, a touch screen of the mobile terminal and entering the mobile terminal into a lock state;
detecting the mobile terminal is tilted more than a predetermined slope;
receiving a first touch input on the deactivated touch screen;
controlling the short-range communication module to transmit a first IR signal to an external device for controlling the external device when the first touch input matches a predetermined password for unlocking the mobile terminal into an unlocked state; and
activating the short-range communication unit when the mobile terminal is tilted more than the predetermined slope and the short-range communication module is deactivated.

11. The method of claim 10, further comprising:
activating the deactivated touch screen, unlocking the mobile terminal, and displaying a first screen on the touch screen for controlling the external device when the first touch input matches the predetermined password.

12. The method of claim 11, further comprising:
receiving a second touch input on the deactivated touch screen;
controlling the short-range communication module to transmit a second IR signal to the external device;
activating the deactivated touch screen; and
displaying a second screen on the touch screen for controlling the external device corresponding to the second IR signal while maintaining the lock state of the mobile terminal.

13. The method of claim 12, wherein the first screen and the second screen comprise a remote controller user interface for controlling the external device, and
wherein at least a part of the first screen is different from the second screen.

14. The method of claim 12, further comprising:
receiving a response signal transmitted from the external device via the short-range communication module in response to the second IR signal; and
displaying the second screen on the touch screen based on the received response signal.

15. The method of claim 14, wherein the second IR signal is transmitted from the short-range communication module according to a first communication protocol, and
wherein the response signal is received by the short-range communication module according to a second communication protocol different from the first communication protocol.

16. The method of claim 12, wherein the first IR signal corresponds to a first user, and
wherein the second IR signal corresponds to a second user.

17. The method of claim 16, wherein the first user is a primary user of the mobile terminal and the second user is a secondary user of the mobile terminal.

18. The method of claim 10, wherein the first IR signal includes a command to power on the external device.

* * * * *